United States Patent
Natarajan et al.

(10) Patent No.: US 12,263,599 B2
(45) Date of Patent: Apr. 1, 2025

(54) COLLABORATIVE MULTI-ROBOT TASKS USING ACTION PRIMITIVES

(71) Applicant: Intel Corporation, Santa Clara, CA (US)

(72) Inventors: Venkat Natarajan, Bangalore (IN); Arjun Kg, Chennai (IN); Gagan Acharya, Mangalore (IN); Amit Sudhir Baxi, Bangalore (IN); Rita H. Wouhaybi, Portland, OR (US); Wen-Ling Margaret Huang, Los Altos, CA (US)

(73) Assignee: Intel Corporation, Santa Clara, CA (US)

( * ) Notice: Subject to any disclaimer, the term of this patent is extended or adjusted under 35 U.S.C. 154(b) by 794 days.

(21) Appl. No.: 17/213,741

(22) Filed: Mar. 26, 2021

(65) Prior Publication Data
US 2021/0229281 A1    Jul. 29, 2021

(51) Int. Cl.
*B25J 9/16*    (2006.01)
*G05B 13/02*   (2006.01)

(52) U.S. Cl.
CPC ............. *B25J 9/1669* (2013.01); *B25J 9/163* (2013.01); *B25J 9/1676* (2013.01); *G05B 13/027* (2013.01)

(58) Field of Classification Search
CPC ........ B25J 9/1669; B25J 9/163; B25J 9/1676; B25J 9/1682; G05B 13/027; G05B 2219/33056; G05B 2219/39244
USPC .................................................. 700/248, 245
See application file for complete search history.

(56) References Cited

U.S. PATENT DOCUMENTS

| | | | |
|---|---|---|---|
| 2011/0166703 A1* | 7/2011 | Byrne | B25J 9/1682 |
| 2014/0277718 A1* | 9/2014 | Izhikevich | B25J 9/163 |
| 2019/0232488 A1* | 8/2019 | Levine | B25J 9/163 |
| 2019/0275671 A1* | 9/2019 | Natarajan | B25J 9/1664 |
| 2019/0337150 A1* | 11/2019 | Parikh | B25J 9/163 |
| 2021/0158162 A1* | 5/2021 | Hafner | B25J 9/163 |
| 2022/0105624 A1* | 4/2022 | Kalakrishnan | B25J 9/163 |
| 2022/0118622 A1* | 4/2022 | Peerbhai | H04L 67/52 |
| 2022/0126445 A1* | 4/2022 | Zhu | B25J 9/1635 |
| 2022/0171348 A1* | 6/2022 | Mosandl | G05B 13/027 |
| 2022/0258342 A1* | 8/2022 | Gildert | B25J 9/1612 |
| 2022/0331962 A1* | 10/2022 | Pirk | G06F 18/24143 |

OTHER PUBLICATIONS

Andrychowicz, Marcin, "Hindsight Experience Replay", arXiv:1707.01495v3, (Feb. 23, 2018), 15 pgs.

* cited by examiner

*Primary Examiner* — Ramon A. Mercado
*Assistant Examiner* — Ellis B. Ramirez
(74) *Attorney, Agent, or Firm* — Schwegman Lundberg & Woessner, P.A.

(57) ABSTRACT

Various aspects of methods, systems, and use cases include techniques for training or using a model to control a robot. A method may include identifying a set of action primitives applicable to a set of robots, receiving information corresponding to a task (e.g., a collaborative task), and determining at least one action primitive based on the received information. The method may include training a model to control operations of at least one robot of the set of robots using the received information and the at least one action primitive.

25 Claims, 16 Drawing Sheets

Collaborative Robotic Assembly Line

Warehouse Logistics with Hundreds of Collaborating Robots

COLLABORATIVE MULTI-ROBOT TASKS USING ACTION PRIMITIVES

BACKGROUND

Robots may be programmed to complete complex tasks. Collaborative robotics is an important artificial intelligence (AI) application where multiple robots work together autonomously to cooperatively achieve complex tasks. Collaborative robotics spans a wide range of industrial applications, such as smart manufacturing assembly lines, multi-robot automotive component assembly, computer and consumer electronics fabrication, smart retail and warehouse logistics, robotic datacenters, etc.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various examples discussed in the present document.

DETAILED DESCRIPTION

The systems and methods described herein may be used to train a model to operate a robot or a set of robots for various tasks (e.g., a collaborative task). The model may include a model unique to each robot or may include a model used for two or more robots (e.g., all robots in the set of robots). The model may be trained using a reinforcement learning technique or a kinematics-control technique. A set of action primitives (which may include action primitives for operation of a single robot or interaction primitives for operation of two or more robots collaboratively) may be used with the model for controlling the robots. For example, the model may output a set of action primitives (including one or more action primitives, which may include action or interaction primitives) for controlling a robot or robots to achieve a task (e.g., a cooperative task). The action primitives may be used as ingredients for the model to create a complex interactive system for operation of the robots to achieve a complex task. In one example, the set of robots may include all the same type of robot, and may have all the same type of action primitive or action primitives. In another example, the set of robots may include all the same type of robot, but with two or more different types of action primitives. In yet another example, the set of robots may include two or more different types of robots (e.g., robots with different capabilities, sensors, power, computing, etc.), with the same or different action primitives.

Figure 1A:
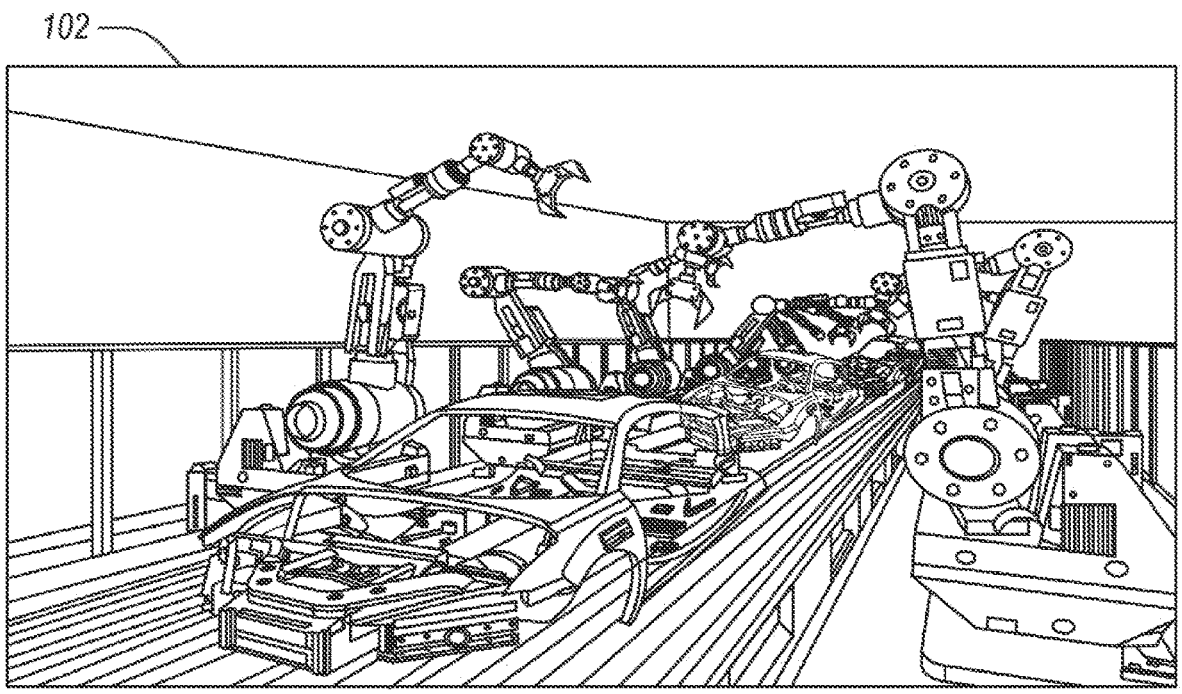
FIGS. 1A-1D illustrate examples of collaborative robotics applications, in accordance with some examples.
Figure 1A:
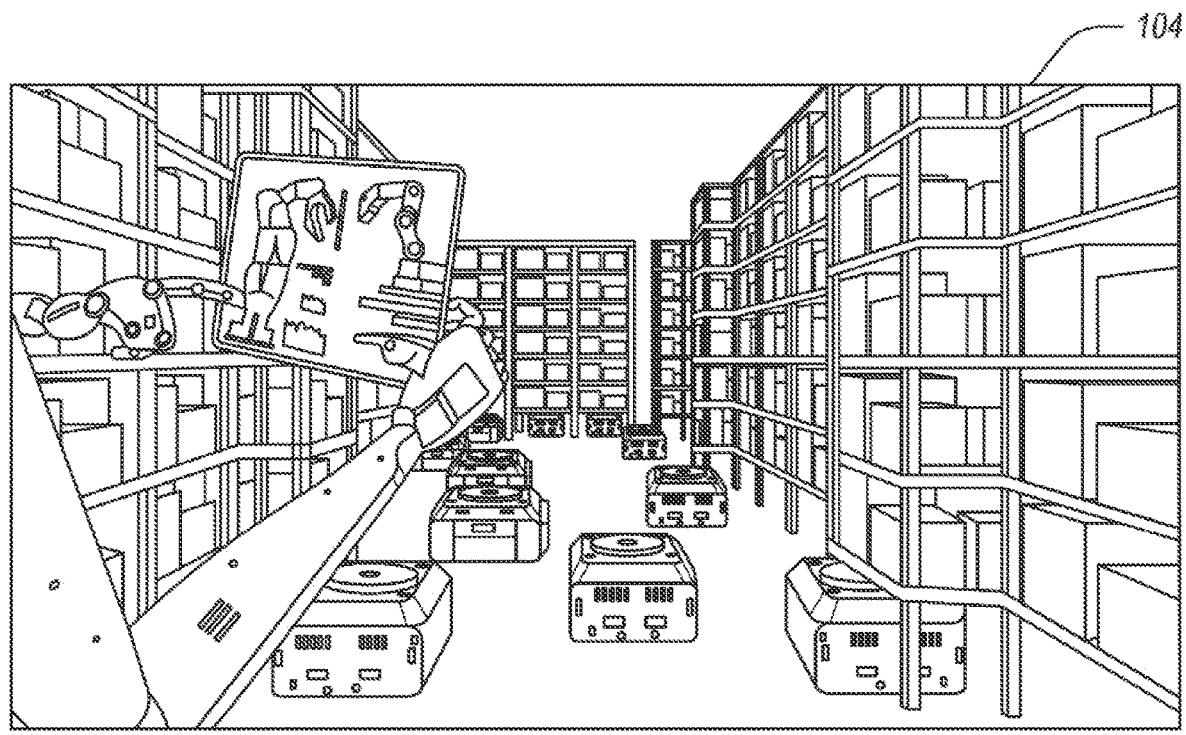

As discussed above, collaborative robotics is an important AI application where multiple robots work together autonomously to cooperatively achieve complex tasks. Collaborative robots spans a wide range of industrial applications such as smart manufacturing assembly lines, multi-robot automotive component assembly, computer & consumer electronics fabrication, smart retail logistics, warehouse logistics, robotic datacenters etc. FIG. 1A illustrates an example collaborative robotic assembly line 102 and a set of collaborative robotics for warehouse logistics 104.

Traditional control system modeling-based approaches are highly challenging to use when developing collaborative robotics systems in practice because they require extensive mathematical and control system modeling, manual programming, customization of kinematics and manipulation logic needed to control and coordinate actions between multiple robots simultaneously. Such manually programmed, brute-force programming methods are not adaptable and are highly fine-tuned to a given application or task, limiting scalability to large numbers of agents or accomplishing complex collaborative tasks.

The systems and methods described herein may use reinforcement learning (RL) to accomplish scale to large numbers of robots or achieve complex collaborative tasks. RL may use minimal custom programming by learning complex behavior models for multiple robots to achieve collaborative tasks. In an example, advantages of an RL-based technique include being highly generalizable, easy to scale, and adaptable to different robotics applications. Some multi-agent reinforcement learning algorithms may only learn very simple tasks and may be inadequate or fail to learn policies for complex collaborative robotic tasks due to high dimensionality of state-action space. Some RL techniques attempt to learn entire complex multi-robotic tasks from scratch (often called end-to-end learning), which tremendously increases the dimensionality of state-action space, thereby making the task learning intractable.

The systems and methods described herein provide a novel RL approach using a primitives-based technique that makes learning of complex collaborative robotic tasks more tractable by relying on previously or first learned simple basic robot actions (RL action primitives), and then optionally learning basic interactions between robots (RL interaction primitives). These primitives may be stored in a library. Previously learned action or interaction primitives may be combined or sequenced by a coordination algorithm to achieve a complex collaborative robotic task (e.g., rather than learning a task entirely from scratch without primitives). This technique may significantly reduce the state-action space. The systems and methods described herein may significantly simplify the creation of collaborative multi-agent applications.

Figure 1B:
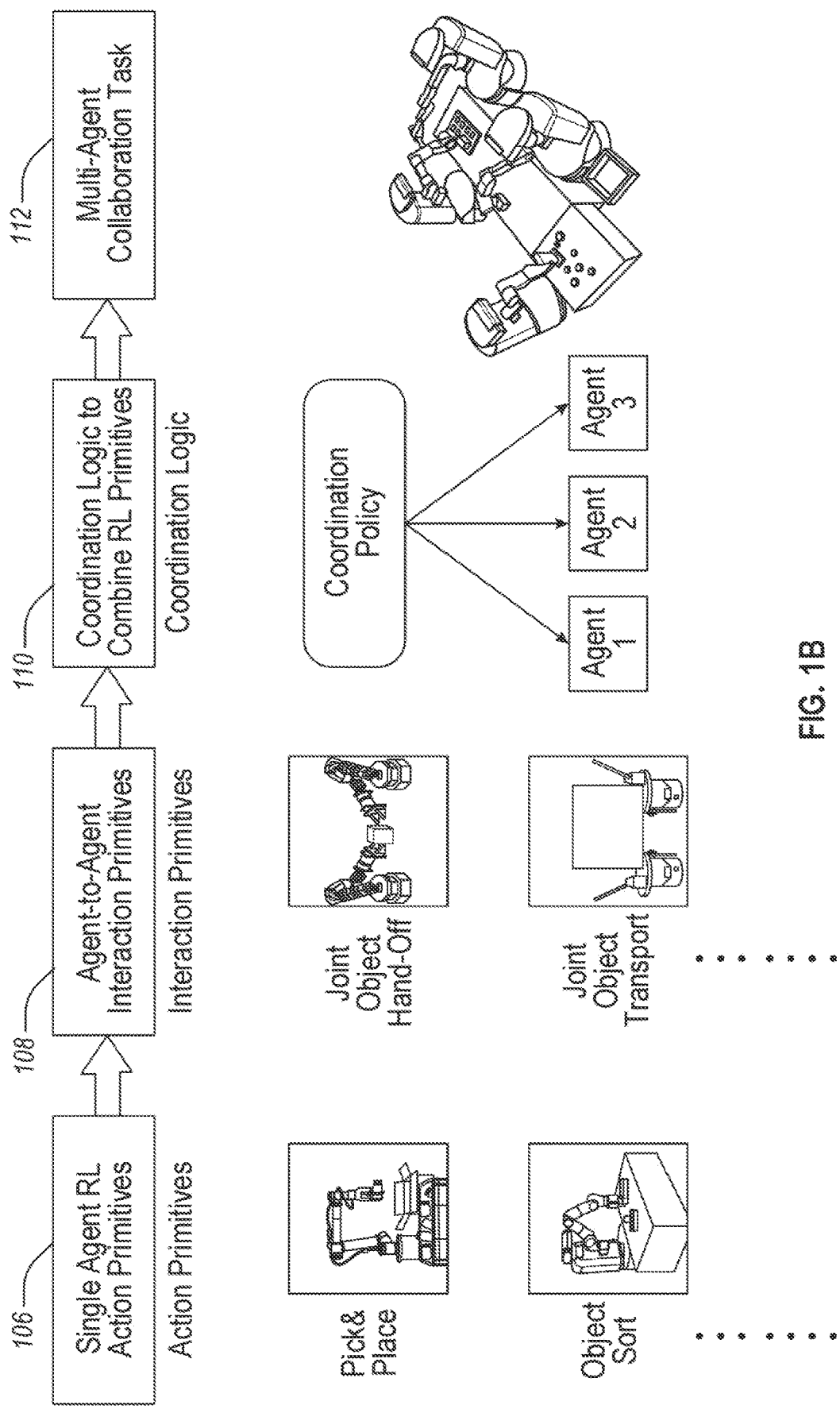
Figure 1C:
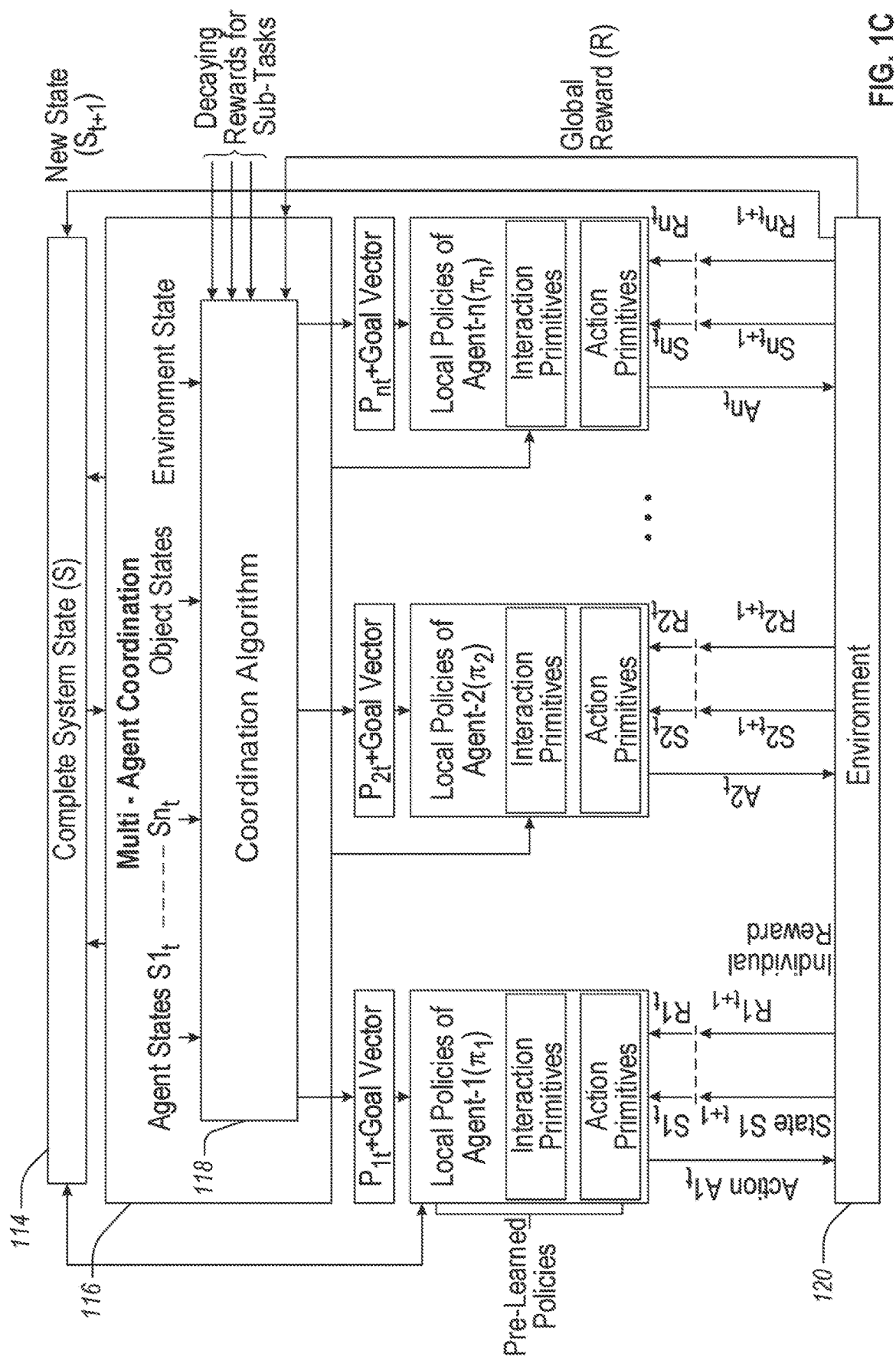
Figure 1D:
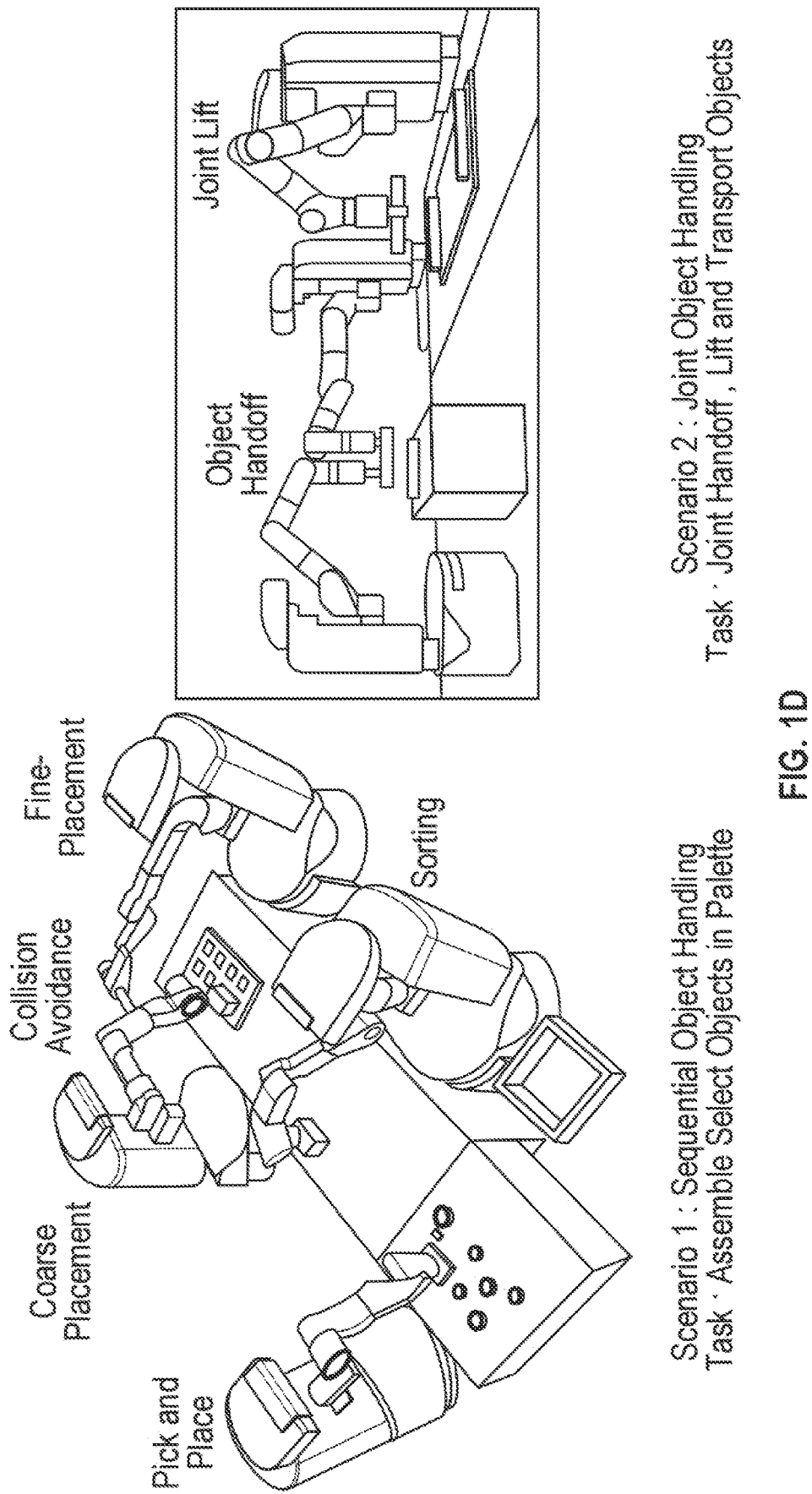

FIG. 1B illustrates a flowchart and FIG. 1C illustrates a block diagram for using reinforcement learning to train a model to learn collaborative robotic tasks involving multiple cooperating robots. In an example, a collaborative robotic task may be discretized into a sequence of basic robot actions or movements (step 106) or robot-to-robot interactions or joint actions (step 108), also called Reinforcement Learning action primitives or interaction motion primitives. A library of basic action or interaction RL primitives may be generated, with policies that are pre-learned (e.g., separately from and before a training process). A coordination layer 118 may be used to sequence primitives from this policy library (step 110) to achieve complex tasks. The coordination technique 118 combines the action and interaction primitives to achieve the cooperative task (step 112) where multiple robots can perform different or identical roles in an environment 120. The coordination technique 119 may be part of a multi-agent coordination layer 116 that uses information from a system state 114 to generate collaborative tasks. For example, four-agent collaborative object assembly using this technique is shown in FIG. 1D in simulation.

A coordination technique 119 may include a fully learned RL policy, a rules-based approach, or a hybrid approach including a partially learned and a partially rules-based system. The RL framework shown in FIG. 1C shows how the coordination layer 118 outputs basic primitive actions for each agent, which the agents execute while performing a task. The coordination layer 118 learns to sequence, output and assign primitives to individual agents in the most optimal manner so as to maximize the reward for completing collaborative task, most efficiently.

As stated above, traditional control-theory or kinematic model-based methods (e.g., non-learning-based methods) to achieve collaborative robotic tasks require extensive mathematical modeling, experimentation, and difficult manual programming, are cumbersome and not adaptable or scalable, and thus are unsuitable for collaborative multi-robot systems.

Figure 2:
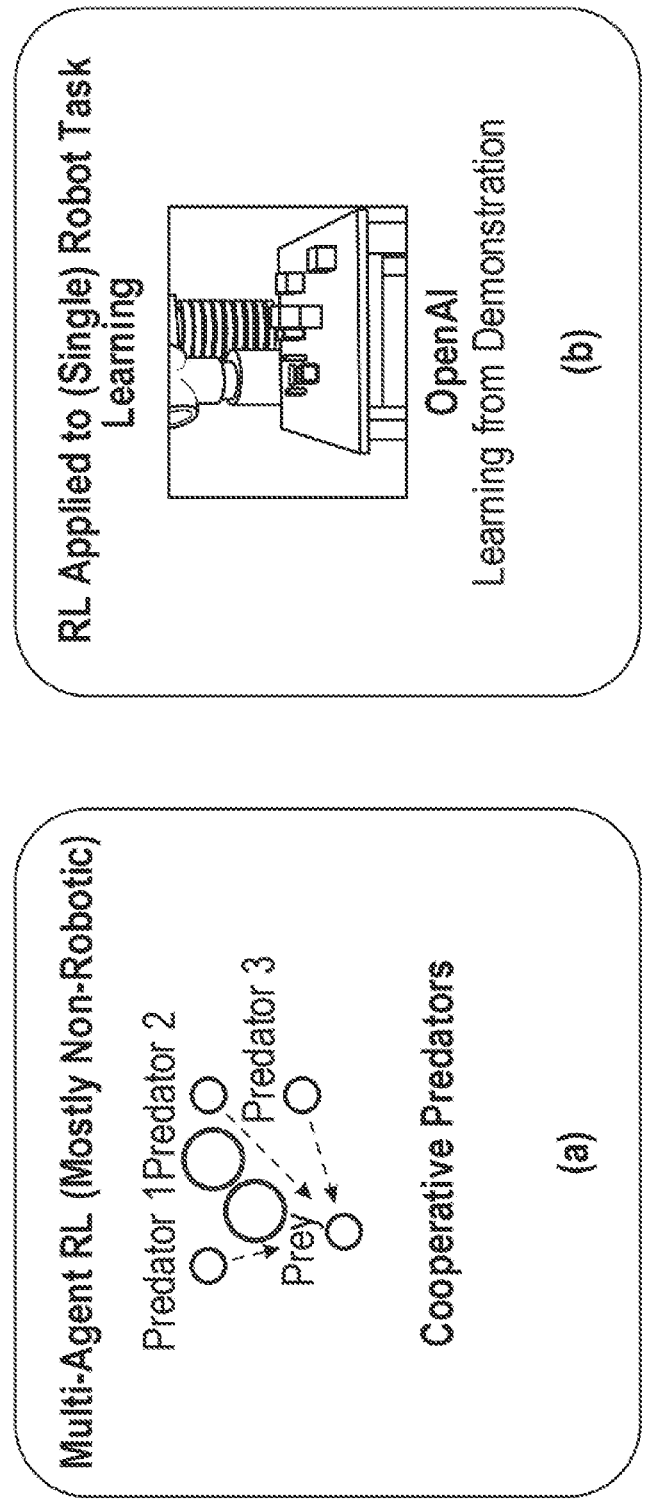
FIG. 2 illustrates Reinforcement Learning (RL) techniques that may be unsuitable to learn complex multi-robot tasks, in accordance with some examples.

FIG. 2 illustrate Reinforcement Learning (RL) techniques that may be unsuitable to learn complex multi-robot tasks, in accordance with some examples. In an example, Multi-agent Reinforcement Learning (MARL) may be used to learn collaborative robotic tasks. However, MARL algorithms have not yet been demonstrated to learn collaborative robotic tasks such as joint assembly. Rather, as shown in FIG. 2, some MARL algorithms have mostly been demonstrated to learn tasks only in simple simulation environments such as cooperative predators (e.g., as shown in (a) in FIG. 2) from OpenAI which uses Multi-agent Deep Deterministic Policy Gradient (MA-DDPG) algorithm. In other examples, OpenAI uses competitive agents learning hide and seek and learn to use tools to effectively improve their strategies. However, these have all been shown in non-robotic environments only.

RL as applied to robotics, is limited to learning single robot tasks such as learning to grasp or learning from demonstration (e.g., as shown in (b) in FIG. 2) from OpenAI for example. However these techniques may not be used learn collaborative multi-robot object manipulation tasks such as joint assembly.

One issue with previous types of hierarchical RL algorithms to learn complex robotic tasks (such as joint assembly, joint object manipulation, joint transport etc.), which use End-to-End (E2E) training, is that they are not able to learn these tasks. This is because in a multi-robot system, each robot has many degrees of freedom resulting in high-dimensional state-action space, combined with sparse rewards and non-stationarity from multiple robots working together. Algorithms such as Feudal Networks, STRAW, HAC, Option-Critic etc. fall in the E2E category and are unsuitable for complex robotic tasks.

Robotic tasks such as learning object manipulation have high-dimensional state-action space and sparse rewards. Current RL algorithms (such as DDPG) attempt to learn entire collaborative multi-robot tasks from scratch, which becomes extremely difficult even in single robot environments. Furthermore, in collaborative multi-robot tasks (such as joint assembly), the task complexity and dimensionality of state-action space increases many fold (compared to single robot task), which makes learning of a collaborative task intractable, when attempted entirely from scratch, such as when using algorithms like DDPG.

Figure 3:
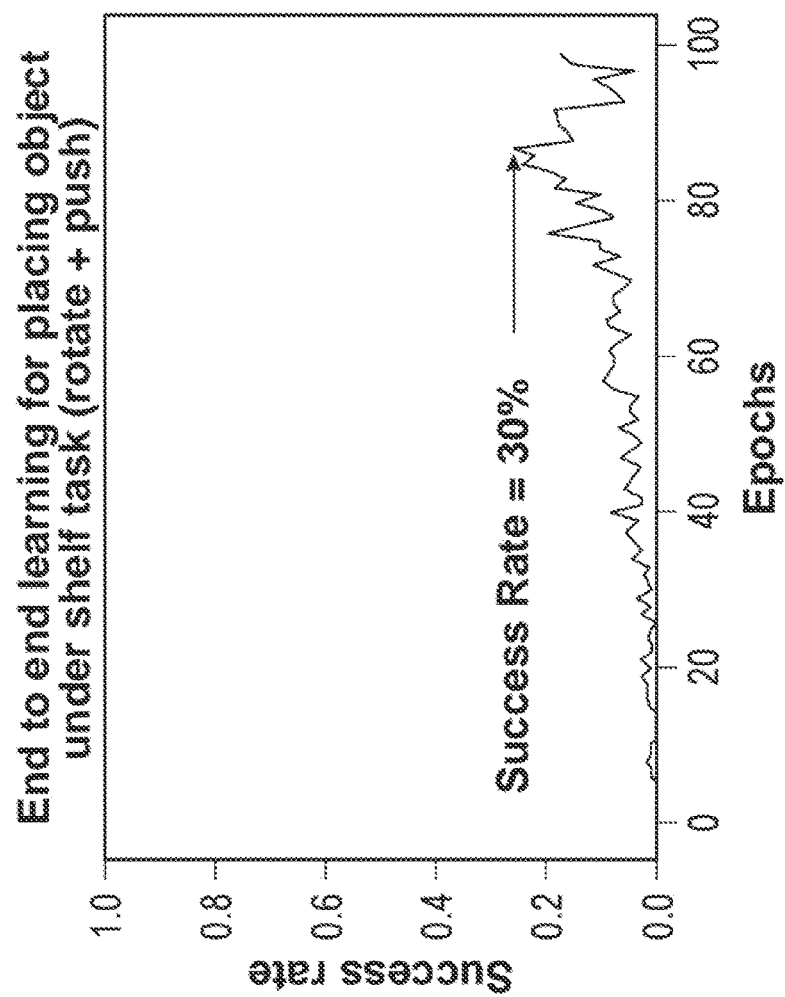
FIG. 3 illustrates that in simulation, prior algorithms fail to learn complex tasks even with a single robot, in accordance with some examples.
Figure 3:
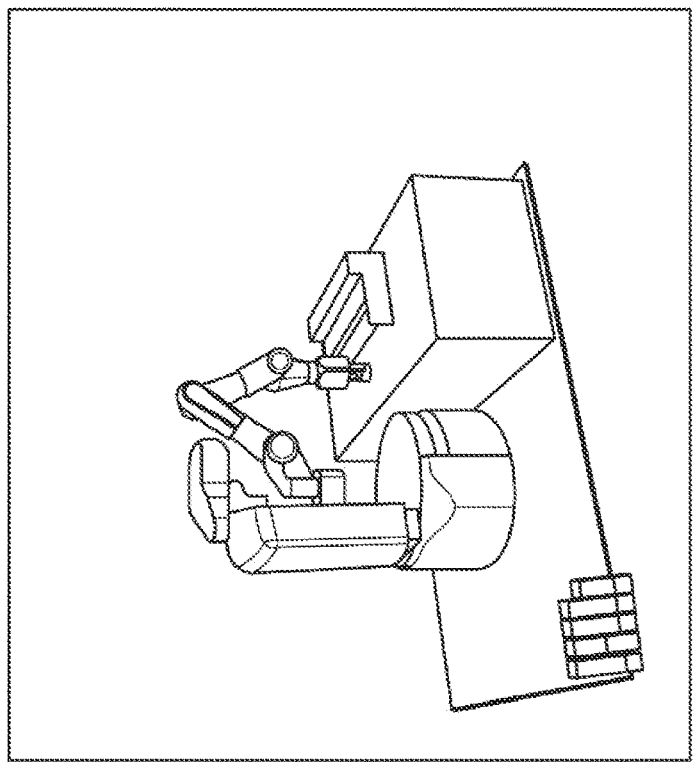

FIG. 3 illustrates an example of the lack of success of traditional RL algorithms. FIG. 3 shows a success rate for a DDPG-HER (DDPG with Hindsight Experience Replay) algorithm to learn a shelf-stocking task, where objective was to stack the blocks in a specific pattern on the shelves. Even in this single robot environment, the robot failed to achieve the task with the DDPG-HER algorithm, achieving a maximum success rate of only 30%.

The systems and methods described herein use a set of pre-learned primitives to train a model to control a robot or a set of robots. First, a collaborative robotic task may be separated into a set of basic actions and optionally robot-to-robot interactions. These actions and interactions may be separately generated or stored, or may be part of a single library of commands. Robot-to-robot interactions may be learned as primitives to help in synchronizing collaborative agents for tasks such as joint object manipulation.

Second, a coordination layer (e.g., shown in FIGS. 8A-8B and discussed below) may output a tuple, such as <'Selected Object', 'Selected RL Primitive', 'Goal Vector'>, which combines both continuous and discrete action spaces. Of these, Goal Vector may be 'continuous' and the other two parameters may be discrete. Using these parameters with the RL primitives allows the same primitive to be used across a range of objects, agents, and tasks in a more modular and scalable manner (e.g., than prior techniques). For example, an end-to-end technique would require one option for every object and corresponding goal location, which would exponentially increase the number of options required.

An additional advantage of the present technique is that since the action or interaction primitives are more generic, they are well-suited both learning-based and human-expert based task design. These primitives may be used in a learning-based only method, a method leveraging expert human knowledge, or a combined expert and learning technique.

The systems and methods described herein include reinforcement learning-based techniques to achieve collaborative multi-robot robot tasks.

Figure 4:
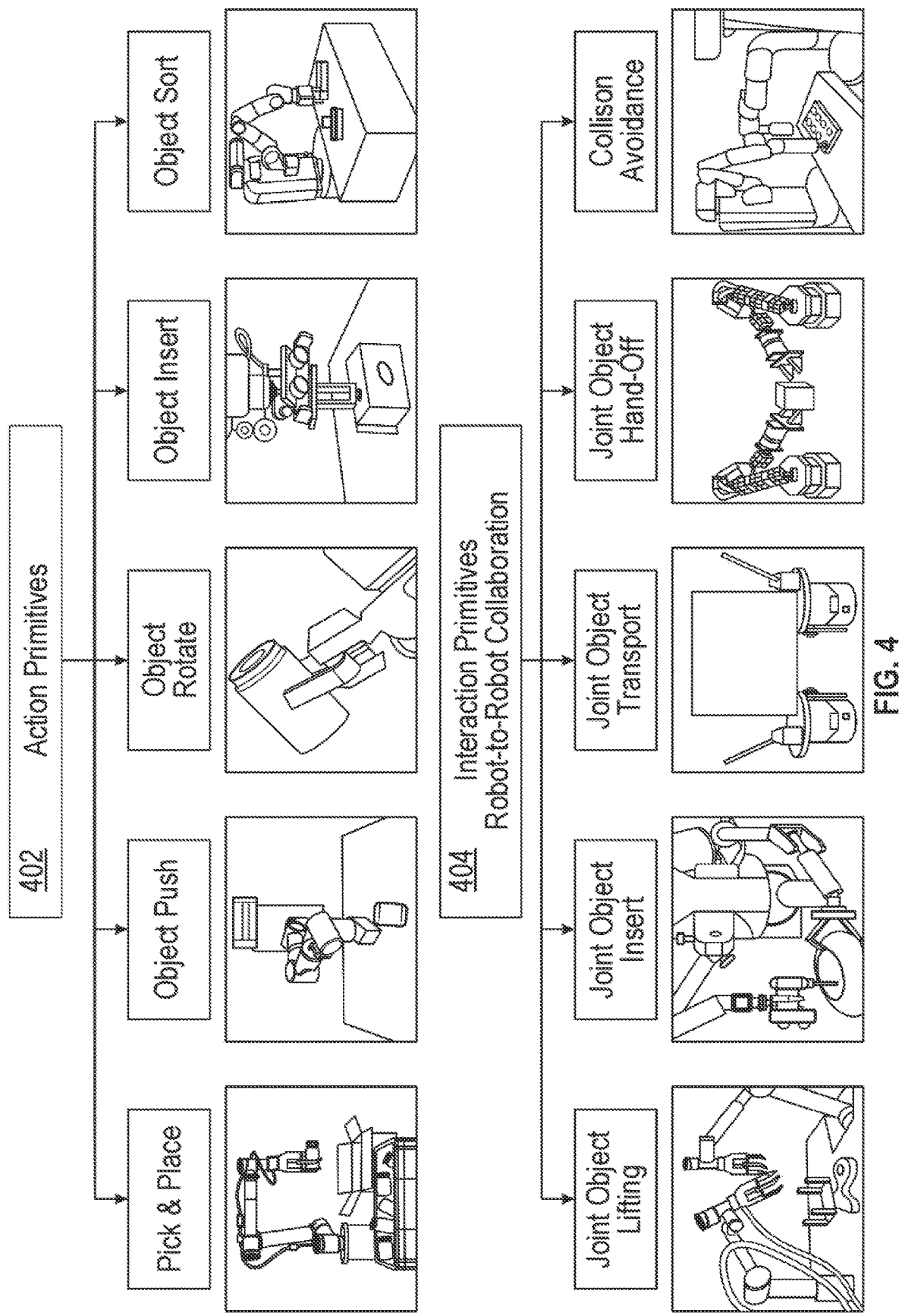
FIG. 4 illustrates a library of robot action and robot-to-robot interaction RL primitives, in accordance with some examples.

FIG. 4 illustrates action primitives 402 and interaction primitives 404 that may be used with the training techniques described herein. The basic motion primitives may be specific to a single type of robot or may be general for more than one type of robot. In some examples, the primitives may be specific to a single robot. The action primitives 402 may include push, pull, lift, pick, place, rotate, insert, sort, or other actions that may be taken by the robot. These action primitives 402 may be learned separately using Reinforcement Learning and these motion or action primitives may be combined or sequenced intelligently to accomplish incrementally more complex motions for the robot.

The basic interaction primitives 404 may be any actions that involve two or more robots jointly working together. Thus, the interaction primitives 404 may be a subset of action primitives 402 (e.g., actions that involve two or more robots), or may be separately generated or stored. The interaction primitives 404 may include joint object lift, joint push, joint insert, joint transport, joint hand-off (e.g., handing off an object from one robot to another), collision avoidance, or the like. These interaction primitives 404 may be intelligently sequenced to accomplish joint tasks. These individual interaction primitives 404 may be learned separately via Reinforcement Learning. A library of these action primitives 402 and interaction primitives 404, which are RL policies that are pre-learned using RL algorithms.

Using the action primitives 402 or the interaction primitives 404, the robots may be controlled (e.g., using a trained model) to perform a collaborative task without needing to program the robots from scratch. Robotic action-primitive & interaction-primitive policies may be pre-stored in a library, for example as APIs, which may be accessed by a robot for any robotic (e.g., assembly) task as outlined in a goal statement.

Once the action primitives 402 or the interaction primitives 404 are generated, they may be used to program a robot or set of robots to complete a collaborative task. The primitives may be used as inputs to a coordination algorithm that learns to assign, sequence, and combine action or interaction primitives to achieve a collaborative task (even ones with higher degree of complexity). With this approach, the need to learn complex actions from scratch may be avoided (e.g., end-to-end learning of a task from scratch may be avoided). The complex tasks using the primitives are learned (e.g., used to train a model) as a combination. This makes learning tractable by reducing the dimensionality of state action space and leveraging pre-learned knowledge in the form of basic primitives. Such a RL-primitives based method may be used in applications such as reconfigurable factory assembly lines, in-store or warehouse logistics applications, etc.

The systems and methods described herein provide a technique that makes learning of collaborative tasks in a multi-robot system tractable. The techniques may be applicable to collaborative autonomous systems in general as well such as drone teams, autonomous vehicles etc. The techniques may be generalized to diverse robotic applications involving multiple robots and not just limited to a specific robotic task. The techniques may be used for practical deployment as it requires minimal programming from a user. This significantly simplifies the creation of collaborative multi-robot applications for customers (as compared to traditional kinematics-based, model-based manual programming method). The multi-robot learning framework may reduce the barrier to entry for collaborative multi-robot applications.

An example process for generating and using the action primitives 402 is described below. In some examples, generation of the action primitives 402 or the interaction primitives 404 may be performed before or independently of learning or training aspects. Generating action primitives 402 may include learning basic actions of a single robot (e.g., Reinforcement Learning Action Primitive policies) using RL. The single robot may be a robot of a particular type, a single particular robot, or a set of robots (e.g., one of each type). Learning in this context may include supervised or unsupervised learning. Generating interaction primitives 404 may include learning basic actions involving two or more collaborating robots (called RL Interaction Primitive policies). In an example, the primitives 402 or 404 may be learned using a RL algorithm, such as Deep Deterministic Policy Gradient with Hindsight Experience Replay (DDPG-HER).

After creation (e.g., using a different device, at a different time, immediately after, etc.) of the primitives, they may be stored in a library of RL policies. The policy library may reside on individual robots, on an edge server, on a remote server, on a single robot, on a plurality of robots, etc. The primitives may be used to control one or more robots to complete a complex task. A complex task may include any task that includes two or more primitives (e.g., lift and move, move and joint lift, object handoff and move, etc.), and one or more robots.

A collaborative robotics system may be used to achieve any complex multi-robot task by selecting, combining, and coordinating different policies from the library. The system includes the primitives library and a coordination algorithm that may output a tuple, such as <object, primitive, goal vector> to a robot at a time-step. The robot may execute a primitive or primitives to accomplish the collaborative task.

The coordination algorithm may be used to combine the pre-learned action and interaction primitives, and allocate and sequence appropriate RL action/interaction primitives to achieve a collaborative task. The coordination may be implemented by planning (e.g., according to a set of rules) or may be learned using reinforcement learning (as shown below and in FIGS. 8A-8B) or may be a hybrid approach (e.g., including learning and rules).

Figure 5:
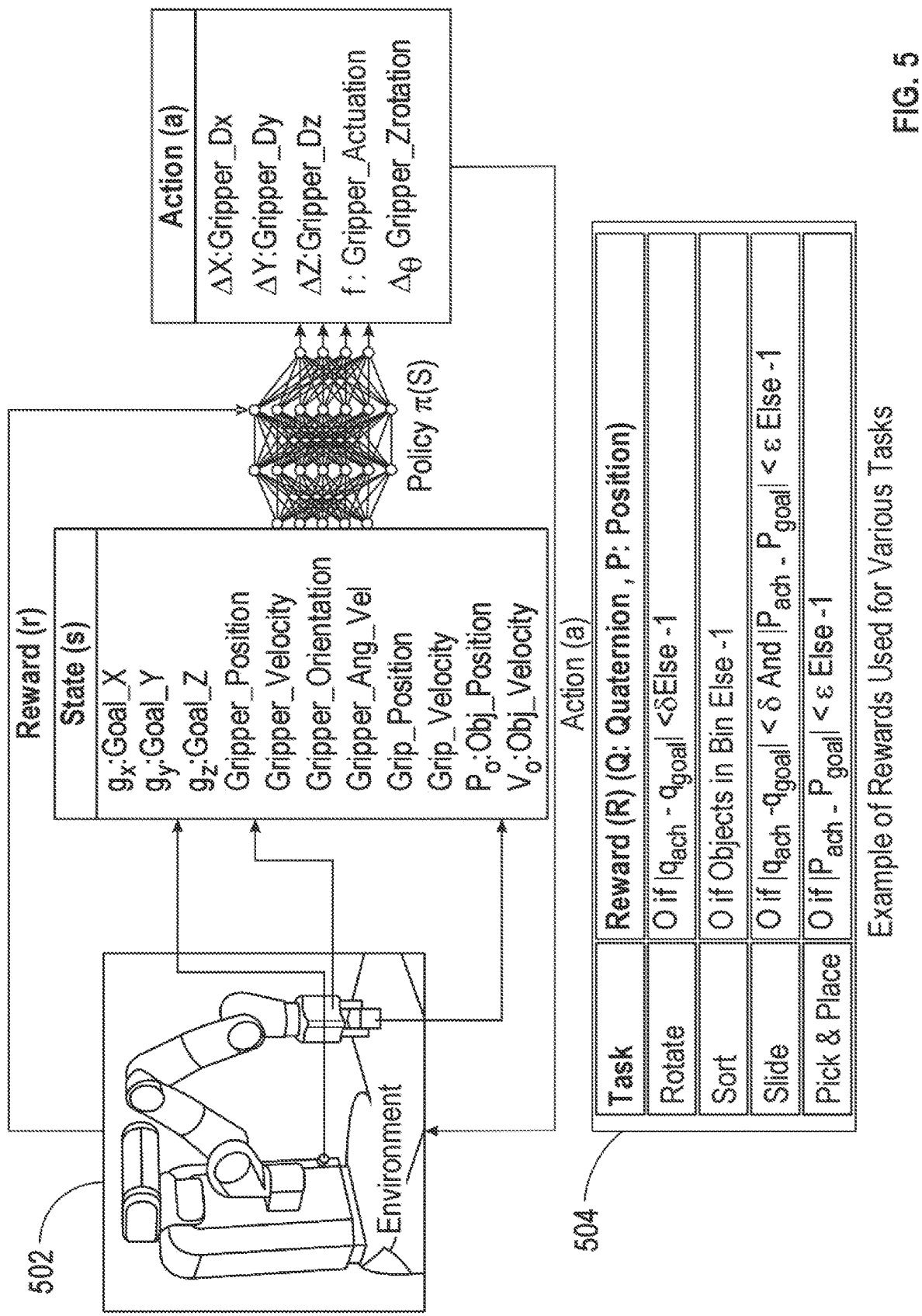
FIG. 5 illustrates a block diagram showing a system to learn robot action-primitives, in accordance with some examples.

FIG. 5 illustrates a block diagram showing a system to learn robot action-primitives. FIG. 5 shows an example State space, an example Action Space, and an example Reward distribution in the RL domain. The state space, action space, and reward may be used to learn basic robot actions (e.g., primitives) such as Object Rotate, Object Sort, Object Slide and Object Pick-&-Place. In order train a robot 502 for different primitive actions, different rewards are specified depending on the action to be learned as shown in table 504 in FIG. 5.

Figure 6:
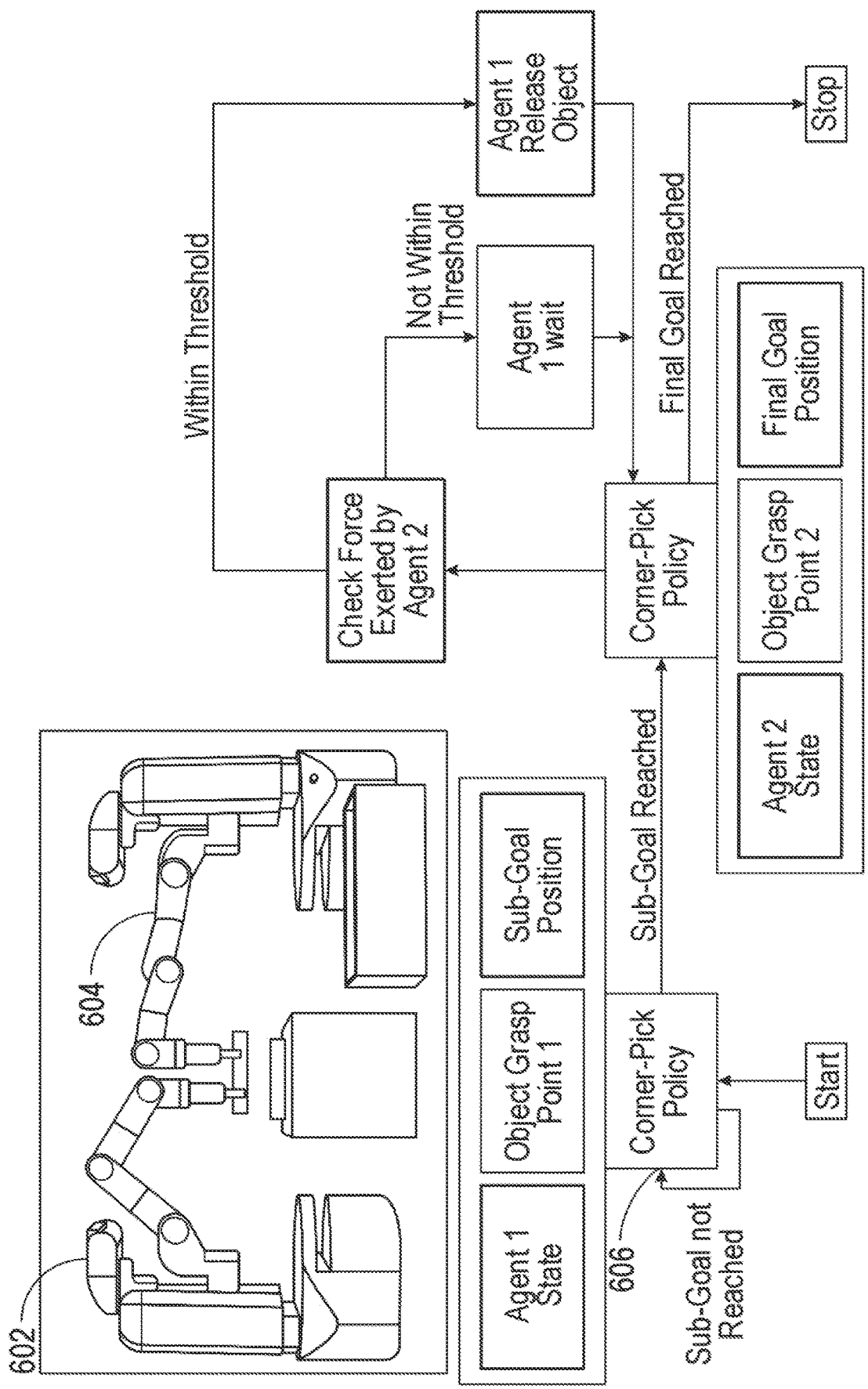
FIG. 6 illustrates an example showing creation of robot-to-robot interaction primitive for object handoff from one robot to another, in accordance with some examples.

Interaction primitives are basic robot actions involving collaboration between two or more robotic agents and examples include actions such as joint object lift, joint object hand-off etc. Interaction primitives may be leveraged and combined to perform more complex collaborative maneuvers. An example for learning an interaction primitive is shown in FIG. 6. The example includes learning joint object hand-off between two robotic arms. Here a first robot 602 first learns to pick up a cuboidal object from a corner of the object rather than from a center of the object since this is more convenient while handing off the object to a second robot 604. This robot action is called the Corner Pick policy (illustrated in block 606). Both robots involved in the handoff are then equipped with this Corner Pick policy. The Corner Pick policy is an action primitive, which may be selected from a library or learned as a modification to a pick action primitive on the fly (e.g., through reinforcement learning). The first robot 602 executes the corner pick policy and picks up the object from the corner and reaches its sub-goal, which is a point of handoff in 3D space. The second robot 604 then executes its own corner pick policy to retrieve the object from the first robot's grasp. The second robot 604 does not necessarily need to learn the Corner Pick policy since the first robot 602 already learned this policy.

In an example, the first robot 602 may learn to complete its sub-goal without involvement of the second robot 604

(e.g., the sub-goal may include picking the object up, moving it to a convenient place for handoff, and making handoff possible or convenient (e.g., by leaving a portion of the object untouched, such as with the Corner Pick policy). In another example, the second robot 604 may be used collaboratively to aid in the learning of the first robot to achieve the sub-goal. For example, the second robot 604 may be placed in a receiving location so that the first robot 602 may use coordinates of the second robot 604 (e.g., via internal coordinates or vision, etc.) for the location without needing to separately learn where to stop. In still other examples, both robots may be used to attempt to achieve the sub-goal to speed up the learning (e.g., by discarding unsuccessful or suboptimal attempts more quickly).

The first robot 602 may learn the Corner Pick policy via trial and error, with a model, or via human control. The first robot 602 may have a list of available primitives, such as grasp, move, etc. to attempt to learn the sub-goal. For example, the first robot 602 may be coordinated to achieve the sub-goal via action primitives to move, grasp, pickup, move, and release.

A force-check may be performed for the first robot 602 to let go of the object when the second robot 604 applies a force. In another example, vision or coordinate knowledge may be used. In still other examples, a timing component may be used. The second robot 604 may take the object to a destination location, again using the Corner Pick and place policy. The interaction between the first and second robot (e.g., handoff) may be an interaction primitive or a set of interaction primitives. Such interaction primitives may be learned through a variety of methods, including imitation learning, reinforcement learning, or may be defined as a combination of action primitives.

Completing the two sub-tasks in this example may make up a complex task for the two robots. In other examples, a complex task may include several sub-tasks (e.g., two for the first robot 602 and one for the second robot 604, two for each, etc.), which are learned before the complex task can be considered trained. In cases where a complex task includes multiple sub-tasks, a sub-task may be reused. Coordination for completion of a complex task includes both learning combinations of actions as well as ordering actions or combinations of actions.

Each sub-task or complex task may include a reward. The reward is used in the reinforcement learning portion to generate positive feedback to learn the sub-task or complex task. System state-space information (e.g., state of objects being manipulated, the robot state, state of the operating environment of the robots) may be considered when learning the sub-task or complex task.

A Complete System state (e.g., 114 from FIG. 1C), which includes states of robots (e.g., location, joint angles, velocity etc.), state of environment (e.g., environment map, obstacles etc.) and state of objects being manipulated (e.g., type, location and pose of objects being handled) may be used. The complete system state 114 may be collected from one or multiple robots and environmental sensors (e.g., multiple cameras) in real-time. Information for the complete system state 114 may be maintained in a central server or edge server, for example.

Based on the system state and desired goal of the collaborative task, a Coordination Algorithm (e.g., 118 of FIG. 1C) may determine which action or interaction primitives are to be executed by each robot or a particular robot at each time step to accomplish the desired collaborative task or sub-task.

A coordination layer may use the complete system state S and the goals and roles (e.g., defined by a user) for each robot agent to determine which primitives are to be executed by which robot agent at each time step. A coordination layer may output a selected action or interaction primitive (e.g., $P_1t, P_2t \ldots P_nt$ of FIG. 1C) for each robot along with a respective Goal Vector for the primitive to coordinate actions of multiple robots. Each robot may be given access to an action or interaction primitive library. Using that access, a particular robot may execute the basic primitive action (e.g., $P_nt$) according to instructions from the coordination policy. The coordination layer may output a tuple <object, primitive, goal vector> to each robot at each time-step, which the robot may execute towards accomplishing the collaborative task.

When an interaction primitive is assigned, a respective pair of robots (or a set of robots) may be controlled simultaneously by the interaction primitive policy until the goal of the interaction primitive is achieved. The resulting robot actions (e.g., $A_1t, A_2t, \ldots A_nt$ of FIG. 1C) applied to the multi-robot robot environment change the system state S and states accessible to individual agents (e.g., Sat of FIG. 1C). A next time step may be implemented, using the changes to the states in the reinforcement learning technique to learn the complex task.

The coordination layer may be implemented through a planning (e.g., via rules selected by a user) based approach, may be fully learned using Reinforcement Learning, or may use a hybrid approach combining partial rules and learning. The coordination layer may learn to maximize a global reward R (e.g., corresponding to a successful collaborative task completion) by learning to coordinate actions of multiple robots appropriately, such as by outputting optimal primitives and goal vectors to each of the robot agents. In some examples, local rewards may be used (e.g., to complete a sub-task). The local rewards may be used in conjunction with the global reward or may be learned separately.

Figure 7:
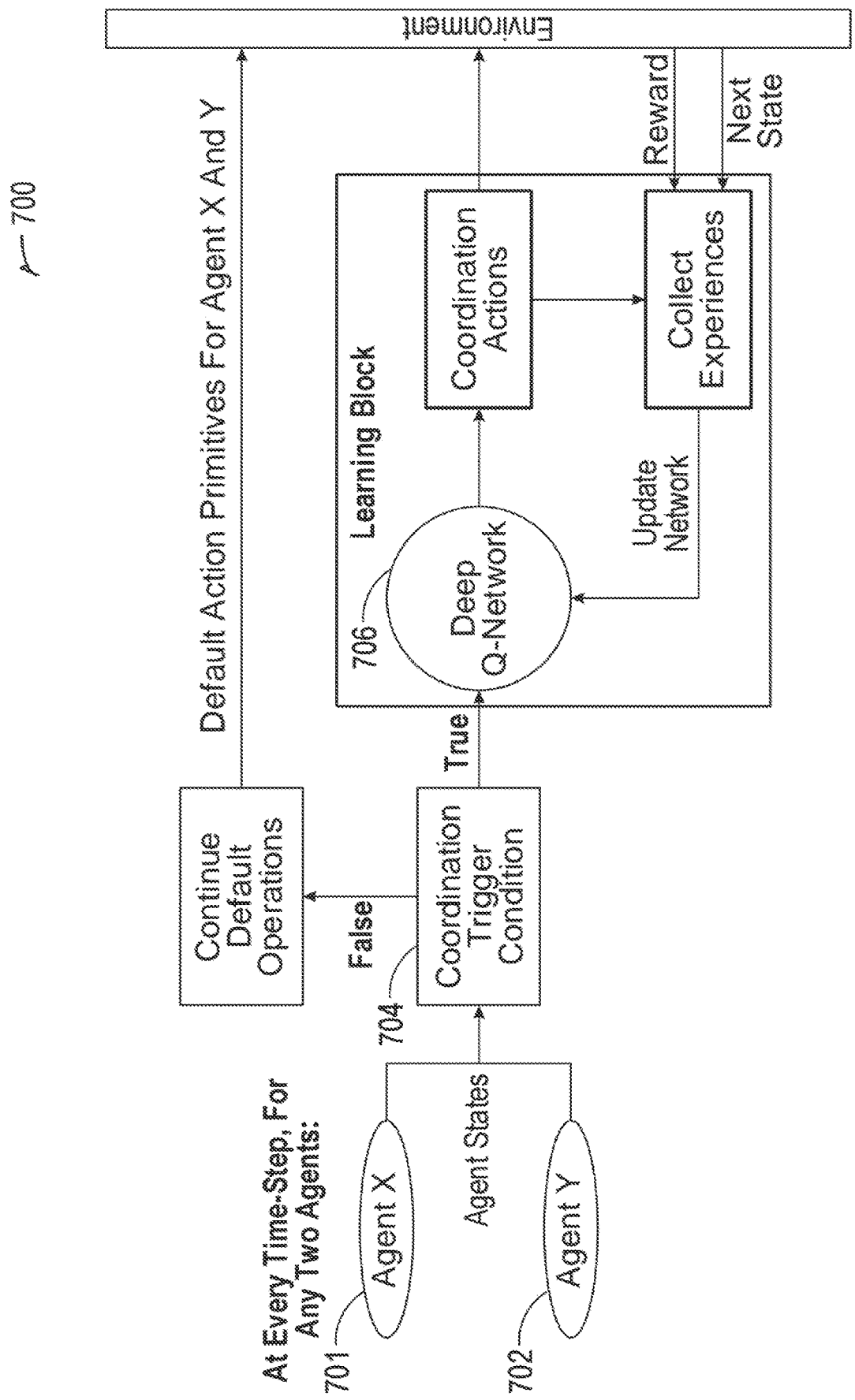
FIG. 7 illustrates an example of a Coordination Learning technique to avoid collisions between robot arms during collaborative tasks, in accordance with some examples.
Figure 8A:
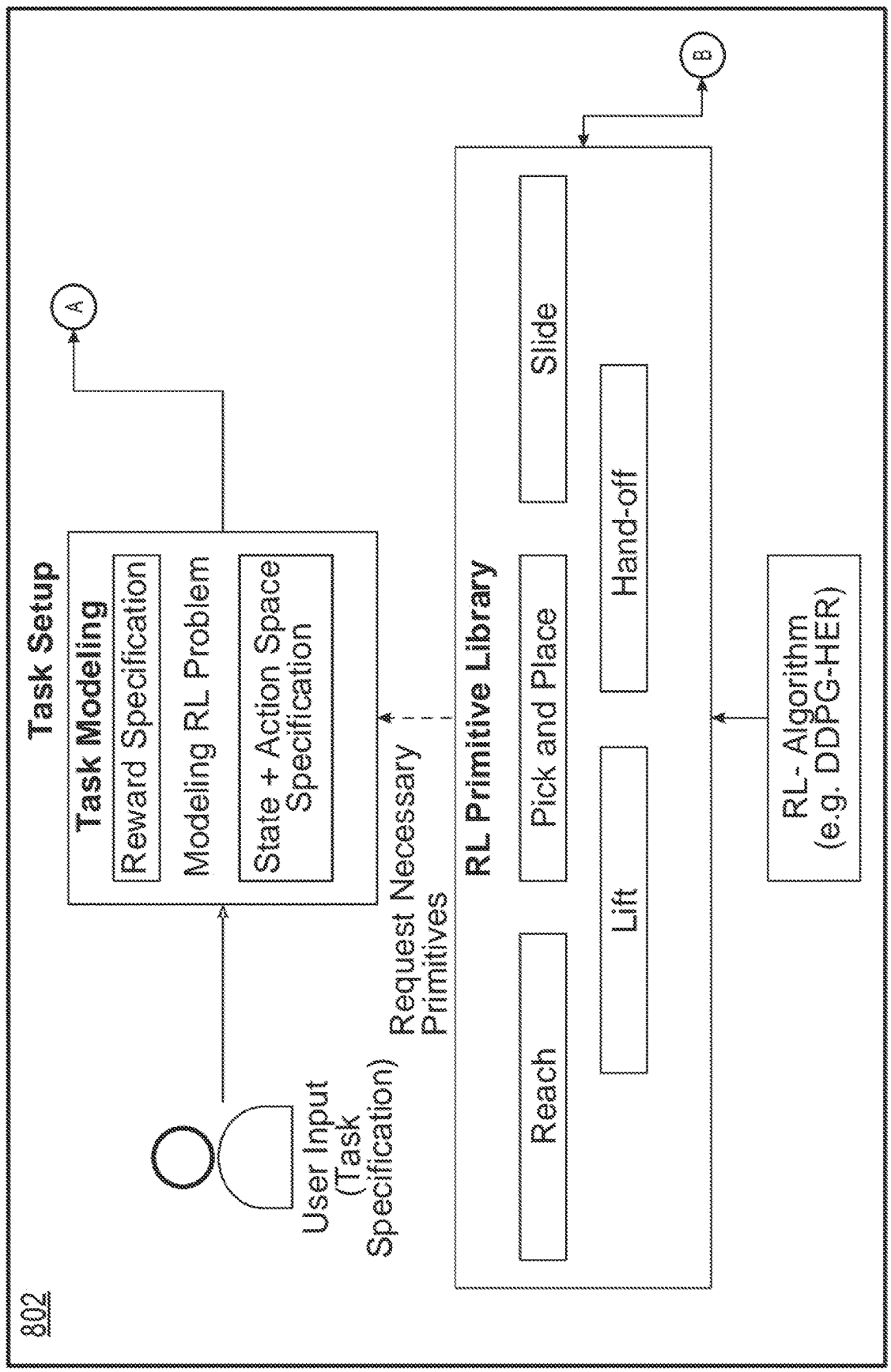
FIGS. 8A-8B illustrate a block diagram for learning to coordinate actions of multiple agents to achieve collaborative tasks, in accordance with some examples.
Figure 8B:
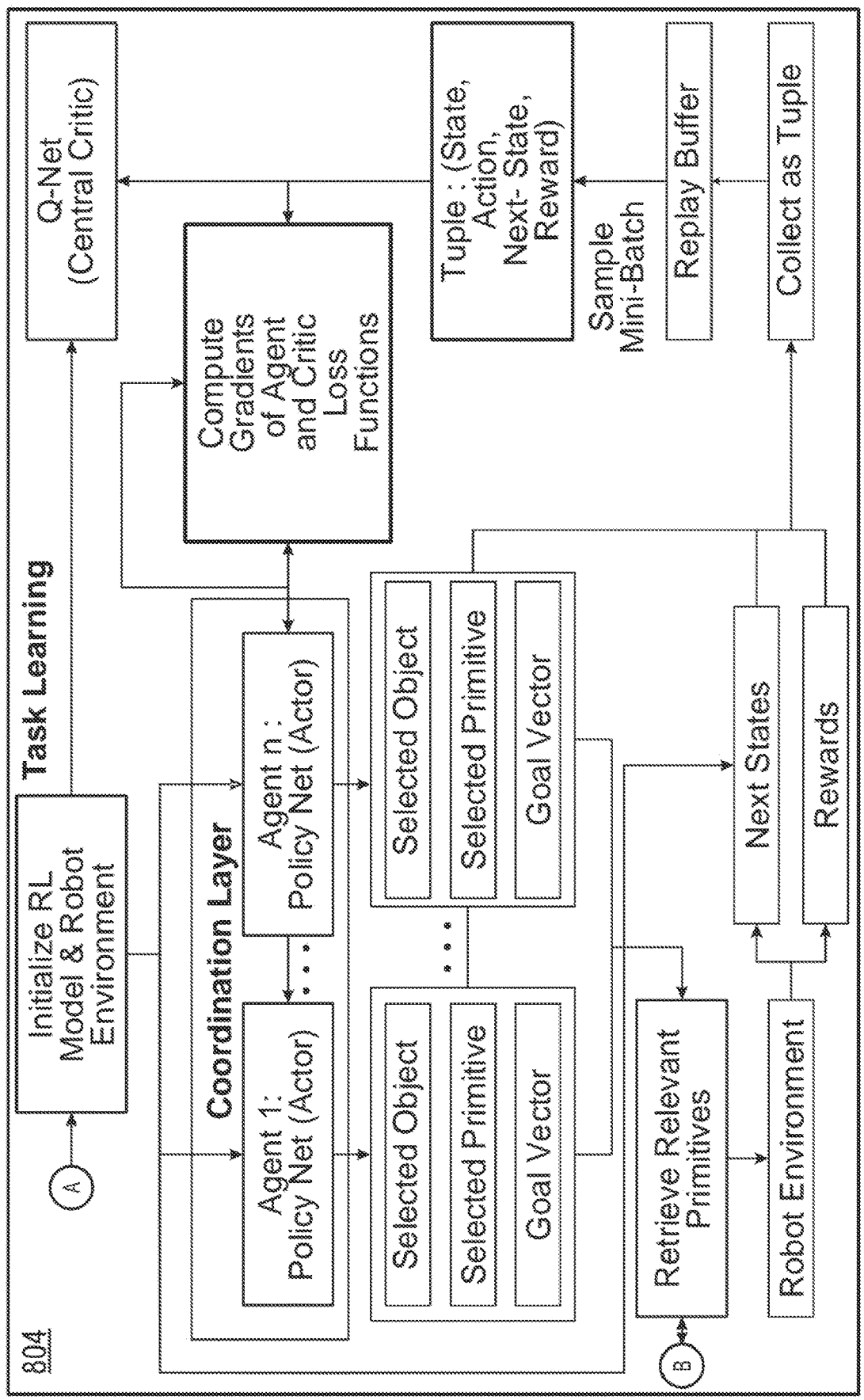

FIG. 7 is a simplistic depiction of coordination learning to avoid collision between robotic arms during a collaborative assembly task. As shown in FIG. 7, a coordination algorithm 700 has access to states of the robot agents 701 and 702, such as their locations, joint angles, gripper locations, etc. (this information may vary depending on the type of robot). As long as the robot agents are not in close proximity (e.g., do not trigger activation of collision avoidance) they may continue to execute action primitives, which are output by the coordination algorithm 700 to complete a collaborative task (e.g., object hand off). When the robots are in close proximity and on a collision path, a trigger condition block 704 feeds experiences to a Deep Q network 706 for learning. The Deep Q network 706 may learn to output collision avoidance actions such as Stop or Retract (back-off). The robots in that example may stop executing default action primitives and instead execute collision avoidance actions. This learning architecture may be scaled for learning to coordinate more complex actions of several robotic agents (e.g., as shown in FIGS. 8A-8B). In some implementations, a coordination algorithm may be deployed on an on-premise edge server or other device with a low-latency communication network (Wireless TSN) between the robotic agents and the edge server (e.g., one of the robots itself).

FIGS. 8A-8B illustrate a block diagram for learning to coordinate actions of multiple agents to achieve collaborative tasks by outputting appropriate RL primitives to respective agents, in accordance with some examples.

FIG. 8A includes a task setup block 802 and FIG. 8B includes a task learning block 804. The task setup block 802 includes task modeling and a primitive library and may use a RL algorithm to output information to and receive information from the task learning block 804.

After a library of action or interaction motion primitives learned via RL algorithm (e.g., DDPG-HER) or kinematics-control technique is created as described above, a user may specify a collaborative task for task learning within a particular environment. This may be accomplished by specifying a reward and optionally identifying state and action-space (in other examples, the state and action-space may be derived from sensor data, robot inputs, etc.). The reward may be specified as a high positive global reward which is common for all the agents for completing the entire complex task or small positive local rewards for a single agent or a set of agents. The local rewards may be used in conjunction with the global reward in some examples. The rewards may be used to guide behavior of specific agents. Negative rewards may be specified to prevent violation of certain constraints (e.g., to avoid collisions).

The state space of each robot may include perception inputs, states of other agents, or environment communicated to each robot. State space may include a robot's own position or orientation, the orientation or velocities of a robot's joints, poses of objects or other agent's positions or orientations. The action space of each agent may include a discrete action (e.g., which objects or action primitives to select) or continuous actions (e.g., locations of objects or the goal location vector), which the primitive is to accomplish.

The task learning block 804 includes execution of primitives, a set of primitives, a sub-task, or a complex task. After a task is specified with state-action spaces and rewards (e.g., in block 802), a suitable off-policy deep RL algorithm (e.g., Soft Actor Critic) or a kinematics-control technique may be used to train the agents (e.g., by training a model, which may be specific to a particular agent or robot or general to all agents or robots) using, for example, a centralized learning, decentralized execution paradigm in multi-agent RL (MARL). The agents and a central critic network may be initialized, and execution may begin in the environment. The Coordination Layer learns to select and output an appropriate tuple to each agent (e.g., <'Object', 'RL Primitive', 'Goal Vector'>) to achieve a collaborative task or sub-task, through exploration (e.g., trial and error), using an accumulated reward (local or global) to guide each agent's next set of choices. Based on the chosen primitive, a respective pre-trained primitive policy is retrieved from the library and applied on the environment. The environment then outputs a next state and updated reward values or changes for each agent. The next states are fed into the corresponding agents and the execution loop continues.

Parallelly, during training, the next states and rewards may be collected along with the current state and action outputs and stored in a replay buffer. Some of these m ay be randomly sampled and used to compute gradients of a loss function of the central critic or loss functions of the agents. The exact loss function may vary based on the algorithm, (e.g. Soft Actor Critic may use a loss function that includes a maximum entropy term). These gradients of the loss function may be used to update the central critic as well the individual agents. The training loop continues until required performance is reached (e.g., the complex task or the sub-task is achieved).

The coordination policy may make a prediction every 'k' time steps (e.g., rather than every time step, as in some examples), during which the primitive acts in the environment. Each primitive may have a different 'k'. A primitive-break function may determine whether to terminate the active primitive when particular conditions are satisfied. These conditions may include when the primitive task is complete, when the primitive has exceeded its time limit for completing its task, or when a constraint is violated (e.g., constraints set by the user, a collision constraint that cannot be overcome, or the like). Actions may be collected at every step to be stored in the replay buffer. When an action is not predicted by an agent at a timestep, the last predicted action (e.g., one that the corresponding primitive is currently implementing) may be stored in the buffer.

After task learning is completed, the agents, robots, and model may be deployed without the central critic in the environment, where individual agent policies continue to output respective RL primitives and goal vectors until the collaborative task is completed.

In further examples, any of the compute nodes or devices discussed with reference to the present edge computing systems and environment may be fulfilled based on the components depicted in FIGS. 9A and 9B. Respective edge compute nodes may be embodied as a type of device, appliance, computer, or other "thing" capable of communicating with other edge, networking, or endpoint components. For example, an edge compute device may be embodied as a personal computer, server, smartphone, a mobile compute device, a smart appliance, an in-vehicle compute system (e.g., a navigation system), a self-contained device having an outer case, shell, etc., or other device or system capable of performing the described functions.

Figure 9A:
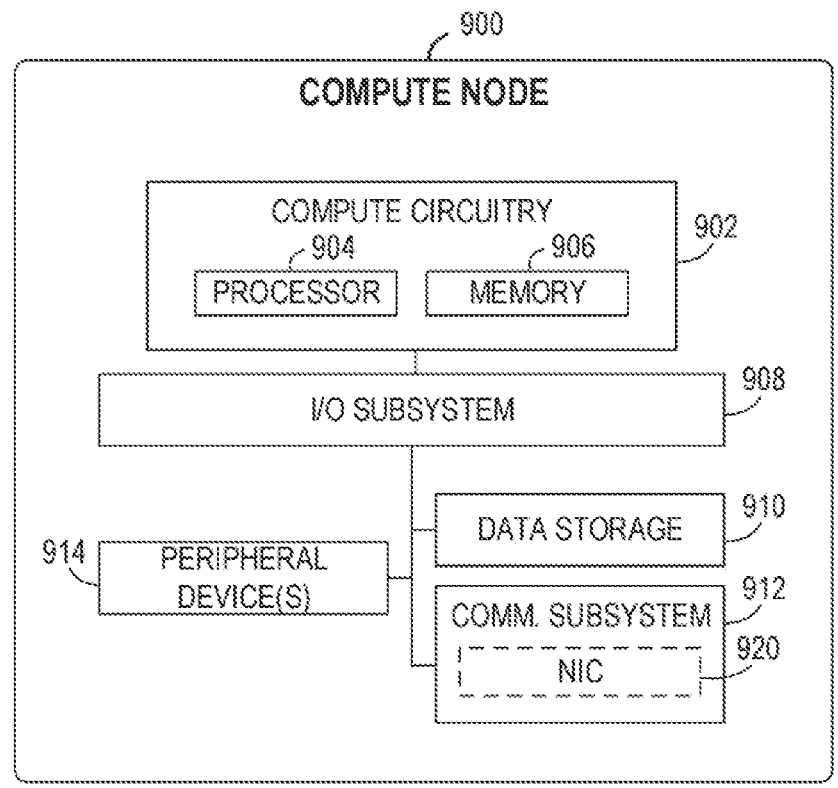
FIG. 9A provides an overview of example components for compute deployed at a compute node.

In the simplified example depicted in FIG. 9A, an edge compute node 900 includes a compute engine (also referred to herein as "compute circuitry") 902, an input/output (I/O) subsystem 908, data storage 910, a communication circuitry subsystem 912, and, optionally, one or more peripheral devices 914. In other examples, respective compute devices may include other or additional components, such as those typically found in a computer (e.g., a display, peripheral devices, etc.). Additionally, in some examples, one or more of the illustrative components may be incorporated in, or otherwise form a portion of, another component.

The compute node 900 may be embodied as any type of engine, device, or collection of devices capable of performing various compute functions. In some examples, the compute node 900 may be embodied as a single device such as an integrated circuit, an embedded system, a field-programmable gate array (FPGA), a system-on-a-chip (SOC), or other integrated system or device. In the illustrative example, the compute node 900 includes or is embodied as a processor 904 and a memory 906. The processor 904 may be embodied as any type of processor capable of performing the functions described herein (e.g., executing an application). For example, the processor 904 may be embodied as a multi-core processor(s), a microcontroller, a processing unit, a specialized or special purpose processing unit, or other processor or processing/controlling circuit.

In some examples, the processor 904 may be embodied as, include, or be coupled to an FPGA, an application specific integrated circuit (ASIC), reconfigurable hardware or hardware circuitry, or other specialized hardware to facilitate performance of the functions described herein. Also in some examples, the processor 904 may be embodied as a specialized x-processing unit (xPU) also known as a data processing unit (DPU), infrastructure processing unit (IPU), or network processing unit (NPU). Such an xPU may be embodied as a standalone circuit or circuit package, integrated within an SOC, or integrated with networking circuitry (e.g., in a SmartNIC, or enhanced SmartNIC), acceleration circuitry, storage devices, or AI hardware (e.g., GPUs or programmed FPGAs). Such an xPU may be designed to receive programming to process one or more data streams and perform specific tasks and actions for the data streams (such as hosting microservices, performing service management or orchestration, organizing or managing server or data center hardware, managing service meshes, or collecting and distributing telemetry), outside of the CPU or general purpose processing hardware. However, it will be understood that a xPU, a SOC, a CPU, and other variations of the processor 904 may work in coordination with each other to execute many types of operations and instructions within and on behalf of the compute node 900.

The memory 906 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In an example, the memory device is a block addressable memory device, such as those based on NAND or NOR technologies. A memory device may also include a three dimensional crosspoint memory device (e.g., Intel® 3D XPoint™ memory), or other byte addressable write-in-place nonvolatile memory devices. The memory device may refer to the die itself and/or to a packaged memory product. In some examples, 3D crosspoint memory (e.g., Intel® 3D XPoint™ memory) may comprise a transistor-less stackable cross point architecture in which memory cells sit at the intersection of word lines and bit lines and are individually addressable and in which bit storage is based on a change in bulk resistance. In some examples, all or a portion of the memory 906 may be integrated into the processor 904. The memory 906 may store various software and data used during operation such as one or more applications, data operated on by the application(s), libraries, and drivers.

The compute circuitry 902 is communicatively coupled to other components of the compute node 900 via the I/O subsystem 908, which may be embodied as circuitry and/or components to facilitate input/output operations with the compute circuitry 902 (e.g., with the processor 904 or the main memory 906) and other components of the compute circuitry 902. For example, the I/O subsystem 908 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 908 may form a portion of a system-on-a-chip (SoC) and be incorporated, along with one or more of the processor 904, the memory 906, and other components of the compute circuitry 902, into the compute circuitry 902.

The one or more illustrative data storage devices 910 may be embodied as any type of devices configured for short-term or long-term storage of data such as, for example, memory devices and circuits, memory cards, hard disk drives, solid-state drives, or other data storage devices. Individual data storage devices 910 may include a system partition that stores data and firmware code for the data storage device 910. Individual data storage devices 910 may also include one or more operating system partitions that store data files and executables for operating systems depending on, for example, the type of compute node 900.

The communication circuitry 912 may be embodied as any communication circuit, device, or collection thereof, capable of enabling communications over a network between the compute circuitry 902 and another compute device (e.g., an edge gateway of an implementing edge computing system). The communication circuitry 912 may be configured to use any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol, Ethernet, Bluetooth®, Bluetooth Low Energy, a IoT protocol such as IEEE 802.15.4 or ZigBee®, low-power wide-area network (LPWAN) or low-power wide-area (LPWA) protocols, etc.) to effect such communication.

The illustrative communication circuitry 912 includes a network interface controller (NIC) 920, which may also be referred to as a host fabric interface (HFI). The NIC 920 may be embodied as one or more add-in-boards, daughter cards, network interface cards, controller chips, chipsets, or other devices that may be used by the compute node 900 to connect with another compute device (e.g., an edge gateway node). In some examples, the NIC 920 may be embodied as part of a system-on-a-chip (SoC) that includes one or more processors, or included on a multichip package that also contains one or more processors. In some examples, the NIC 920 may include a local processor (not shown) and/or a local memory (not shown) that are both local to the NIC 920. In such examples, the local processor of the NIC 920 may be capable of performing one or more of the functions of the compute circuitry 902 described herein. Additionally, or alternatively, in such examples, the local memory of the NIC 920 may be integrated into one or more components of the client compute node at the board level, socket level, chip level, or other levels.

Additionally, in some examples, a respective compute node 900 may include one or more peripheral devices 914. Such peripheral devices 914 may include any type of peripheral device found in a compute device or server such as audio input devices, a display, other input/output devices, interface devices, and/or other peripheral devices, depending on the particular type of the compute node 900. In further examples, the compute node 900 may be embodied by a respective edge compute node (whether a client, gateway, or aggregation node) in an edge computing system or like forms of appliances, computers, subsystems, circuitry, or other components.

Figure 9B:
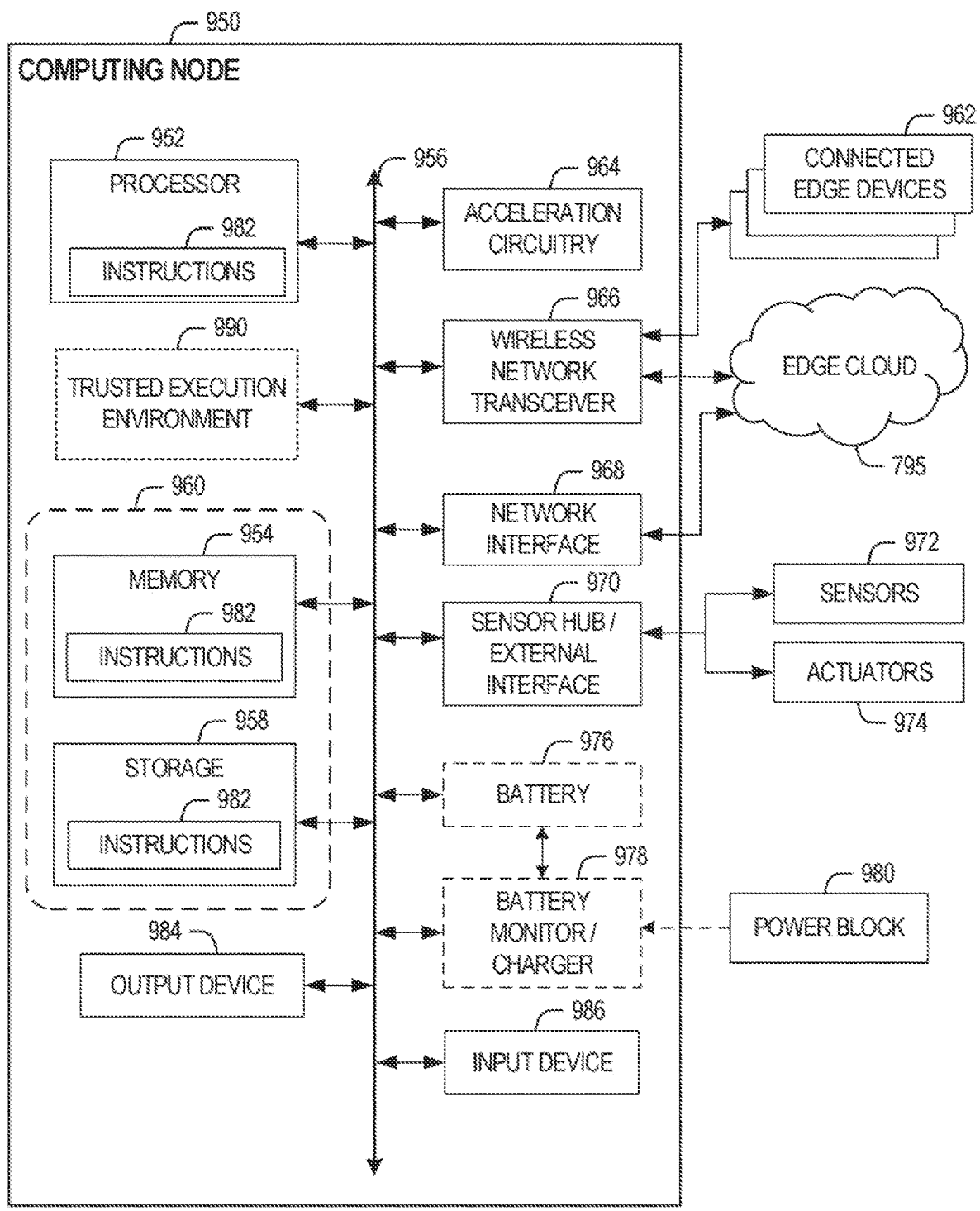
FIG. 9B provides a further overview of example components within a computing device.

In a more detailed example, FIG. 9B illustrates a block diagram of an example of components that may be present in an edge computing node 950 for implementing the techniques (e.g., operations, processes, methods, and methodologies) described herein. This edge computing node 950 provides a closer view of the respective components of node 900 when implemented as or as part of a computing device (e.g., as a mobile device, a base station, server, gateway, etc.). The edge computing node 950 may include any combinations of the hardware or logical components referenced herein, and it may include or couple with any device usable with an edge communication network or a combination of such networks. The components may be implemented as integrated circuits (ICs), portions thereof, discrete electronic devices, or other modules, instruction sets, programmable logic or algorithms, hardware, hardware accelerators, software, firmware, or a combination thereof adapted in the edge computing node 950, or as components otherwise incorporated within a chassis of a larger system.

The edge computing device 950 may include processing circuitry in the form of a processor 952, which may be a microprocessor, a multi-core processor, a multithreaded processor, an ultra-low voltage processor, an embedded processor, an xPU/DPU/IPU/NPU, special purpose processing unit, specialized processing unit, or other known processing elements. The processor 952 may be a part of a system on a chip (SoC) in which the processor 952 and other components are formed into a single integrated circuit, or a single package, such as the Edison™ or Galileo™ SoC boards from Intel Corporation, Santa Clara. California. As an example, the processor 952 may include an Intel® Architecture Core™ based CPU processor, such as a Quark™, an Atom™, an i3, an i5, an i7, an i9, or an MCU-class processor, or another such processor available from Intel®. However, any number other processors may be used, such as available from Advanced Micro Devices, Inc. (AMD®) of Sunnyvale, California, a MIPS&-based design from MIPS Technologies, Inc. of Sunnyvale, California, an ARM®-based design licensed from ARM Holdings. Ltd. or a customer thereof, or their licensees or adopters. The processors may include units such as an A5-A13 processor from Apple® Inc., a Snapdragon™ processor from Qualcomm® Technologies. Inc., or an OMAP™ processor from Texas Instruments, Inc. The processor 952 and accompanying circuitry may be provided in a single socket form factor, multiple socket form factor, or a variety of other formats, including in limited hardware configurations or configurations that include fewer than all elements shown in FIG. 9B.

The processor 952 may communicate with a system memory 954 over an interconnect 956 (e.g., a bus). Any number of memory devices may be used to provide for a given amount of system memory. As examples, the memory 954 may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 958 may also couple to the processor 952 via the interconnect 956. In an example, the storage 958 may be implemented via a solid-state disk drive (SSDD). Other devices that may be used for the storage 958 include flash memory cards, such as Secure Digital (SD) cards, microSD cards, eXtreme Digital (XD) picture cards, and the like, and Universal Serial Bus (USB) flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

In low power implementations, the storage 958 may be on-die memory or registers associated with the processor 952. However, in some examples, the storage 958 may be implemented using a micro hard disk drive (HDD). Further, any number of new technologies may be used for the storage 958 in addition to, or instead of, the technologies described, such resistance change memories, phase change memories, holographic memories, or chemical memories, among others.

The components may communicate over the interconnect 956. The interconnect 956 may include any number of technologies, including industry standard architecture (ISA), extended ISA (EISA), peripheral component interconnect (PCI), peripheral component interconnect extended (PCIx), PCI express (PCIe), or any number of other technologies. The interconnect 956 may be a proprietary bus, for example, used in an SoC based system. Other bus systems may be included, such as an Inter-Integrated Circuit (I2C) interface, a Serial Peripheral Interface (SPI) interface, point to point interfaces, and a power bus, among others.

The interconnect 956 may couple the processor 952 to a transceiver 966, for communications with the connected edge devices 962. The transceiver 966 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 962. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 966 (or multiple transceivers) may communicate using multiple standards or radios for communications at a different range. For example, the edge computing node 950 may communicate with close devices, e.g., within about 10 meters, using a local transceiver based on Bluetooth Low Energy (BLE), or another low power radio, to save power. More distant connected edge devices 962, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A wireless network transceiver 966 (e.g., a radio transceiver) may be included to communicate with devices or services in the edge cloud 995 via local or wide area network protocols. The wireless network transceiver 966 may be a low-power wide-area (LPWA) transceiver that follows the IEEE 802.15.4, or IEEE 802.15.4g standards, among others. The edge computing node 950 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 966, as described herein. For example, the transceiver 966 may include a cellular transceiver that uses spread spectrum (SPA/SAS) communications for implementing high-speed communications. Further, any number of other protocols may be used, such as Wi-Fi® networks for medium speed communications and provision of network communications. The transceiver 966 may include radios that are compatible with any number of 3GPP (Third Generation Partnership Project) specifications, such as Long Term Evolution (LTE) and 5th Generation (5G) communication systems, discussed in further detail at the end of the present disclosure. A network interface controller (NIC) 968 may be included to provide a wired communication to nodes of the edge cloud 995 or to other devices, such as the connected edge devices 962 (e.g., operating in a mesh). The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, among many others. An additional NIC 968 may be included to enable connecting to a second network, for example, a first NIC 968 providing communications to the cloud over Ethernet, and a second NIC 968 providing communications to other devices over another type of network.

Given the variety of types of applicable communications from the device to another component or network, applicable communications circuitry used by the device may include or be embodied by any one or more of components 964, 966, 968, or 970. Accordingly, in various examples, applicable means for communicating (e.g., receiving, transmitting, etc.) may be embodied by such communications circuitry.

The edge computing node 950 may include or be coupled to acceleration circuitry 964, which may be embodied by one or more artificial intelligence (AI) accelerators, a neural compute stick, neuromorphic hardware, an FPGA, an arrangement of GPUs, an arrangement of xPUs/DPUs/IPU/NPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), vis al data processing, network data processing, object detection, rule analysis, or the like. These tasks also may include the specific edge computing tasks for service management and service operatic s discussed elsewhere in this document.

The interconnect 956 may couple the processor 952 to a sensor hub or external interface 970 that is used to connect additional devices or subsystems. The devices may include sensors 972, such as accelerometers, level sensors, flow sensors, optical light sensors, camera sensors, temperature sensors, global navigation system (e.g., GPS) sensors, pressure sensors, barometric pressure sensors, and the like. The hub or interface 970 further may be used to connect the edge computing node 950 to actuators 974, such as power switches, valve actuators, an audible sound generator, a visual warning device, and the like.

In some optional examples, various input/output (I/O) devices may be present within or connected to, the edge computing node 950. For example, a display or other output device 984 may be included to show information, such as sensor readings or actuator position. An input device 986, such as a touch screen or keypad may be included to accept input. An output device 984 may include any number of forms of audio or visual display, including simple visual outputs such as binary status indicators (e.g., light-emitting diodes (LEDs)) and multi-character visual outputs, or more complex outputs such as display screens (e.g., liquid crystal display (LCD) screens), with the output of characters, graphics, multimedia objects, and the like being generated or produced from the operation of the edge computing node 950. A display or console hardware, in the context of the present system, may be used to provide output and receive input of an edge computing system; to manage components or services of an edge computing system; identify a state of an edge computing component or service; or to conduct any other number of management or administration functions or service use cases.

A battery 976 may power the edge computing node 950, although, in examples in which the edge computing node 950 is mounted in a fixed location, it may have a power supply coupled to an electrical grid, or the battery may be used as a backup or for temporary capabilities. The battery 976 may be a lithium ion battery, or a metal-air battery, such as a zinc-air battery, an aluminum-air battery, a lithium-air battery, and the like.

A battery monitor/charger 978 may be included in the edge computing node 950 to track the state of charge (SoCh) of the battery 976, if included. The battery monitor/charger 978 may be used to monitor other parameters of the battery 976 to provide failure predictions, such as the state of health (SoH) and the state of function (SoF) of the battery 976. The battery monitor/charger 978 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX. The battery monitor/charger 978 may communicate the information on the battery 976 to the processor 952 over the interconnect 956. The battery monitor/charger 978 may also include an analog-to-digital (ADC) converter that enables the processor 952 to directly monitor the voltage of the battery 976 or the current flow from the battery 976. The battery parameters may be used to determine actions that the edge computing node 950 may perform, such as transmission frequency, mesh network operation, sensing frequency, and the like.

A power block 980, or other power supply coupled to a grid, may be coupled with the battery monitor/charger 978 to charge the battery 976. In some examples, the power block 980 may be replaced with a wireless power receiver to obtain the power wirelessly, for example, through a loop antenna in the edge computing node 950. A wireless battery charging circuit, such as an LTCA020 chip from Linear Technologies of Milpitas, California, among others, may be included in the battery monitor/charger 978. The specific charging circuits may be selected based on the size of the battery 976, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 958 may include instructions 982 in the form of software, firmware, or hardware commands to implement the techniques described herein. Although such instructions 982 are shown as code blocks included in the memory 954 and the storage 958, it may be understood that any of the code blocks may be replaced with hardwired circuits, for example, built into an application specific integrated circuit (ASIC).

In an example, the instructions 982 provided via the memory 954, the storage 958, or the processor 952 may be embodied as a non-transitory, machine-readable medium 960 including code to direct the processor 952 to perform electronic operations in the edge computing node 950. The processor 952 may access the non-transitory, machine-readable medium 960 over the interconnect 956. For instance, the non-transitory, machine-readable medium 960 may be embodied by devices described for the storage 958 or may include specific storage units such as optical disks, flash drives, or any number of other hardware devices. The non-transitory, machine-readable medium 960 may include instructions to direct the processor 952 to perform a specific sequence or flow of actions, for example, as described with respect to the flowchart(s) and block diagram(s) of operations and functionality depicted above. As used herein, the terms "machine-readable medium" and "computer-readable medium" are interchangeable.

Also in a specific example, the instructions 982 on the processor 952 (separately, or in combination with the instructions 982 of the machine readable medium 960) may configure execution or operation of a trusted execution environment (TEE) 990. In an example, the TEE 990 operates as a protected area accessible to the processor 952 for secure execution of instructions and secure access to data. Various implementations of the TEE 990, and an accompanying secure area in the processor 952 or the memory 954 may be provided, for instance, through use of Intel® Software Guard Extensions (SGX) or ARM® Trust-Zone® hardware security extensions, Intel® Management Engine (ME), or Intel® Converged Security Manageability Engine (CSME). Other aspects of security hardening, hardware roots-of-trust, and trusted or protected operations may be implemented in the device 950 through the TEE 990 and the processor 952.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., Hypertext Transfer Protocol (HTTP)).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

Figure 10:
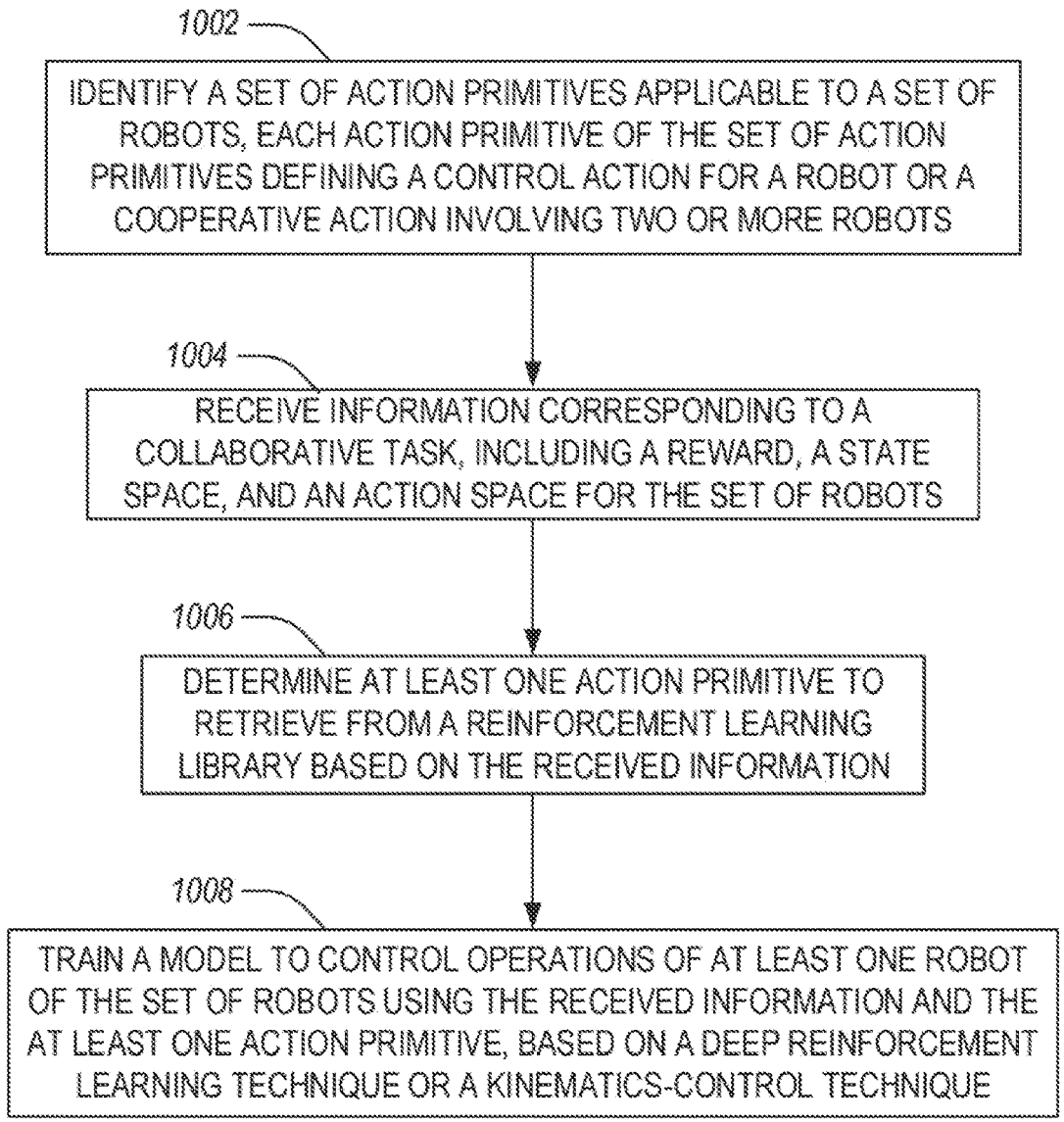
FIG. 10 illustrates a flowchart showing a technique as described herein in accordance with some examples.

FIG. 10 illustrates a flowchart showing a technique 1000 as described herein. The technique 1000 may be performed by a device including processing circuitry and memory. In an example, the processing circuitry and memory are part of a command device in communication with each of a set of robots. The memory may include instructions, to be executed by the processing circuitry. The instructions may include operations to deploy a trained model (see below) to control actions of the set of robots to achieve a task without use of the command device. For example, once the model is trained, the command device may not be needed or used. Instead, the set of robots may act independently (or collaboratively among the set of robots), such as without further input from non-robotics devices.

The technique 1000 includes an operation 1002 to identify a set of action primitives applicable to the set of robots, each action primitive of the set of action primitives defining a control action for a robot or a cooperative action involving two or more robots.

The technique 1000 includes an operation 1004 to receive information corresponding to a collaborative task, including a reward, a state space, and an action space for the set of robots. The information received in operation 1004 may include goal and state information. The goal and state information may be programmed by a user, automated based on an initial input, or may include a hybrid automation with user guidance. In an example, a respective state space for a particular robot includes at least one of perception inputs, position, or orientation information for the particular robot, position or orientation information for robots other than the particular robot, or a pose of an object in an environment. The perception inputs may include information from a camera, LIDAR, GPS, or other sensor. The action space may include an available action primitive or a goal location vector. In an example, the reward may include a global reward for all robots of the set of robots, a local reward or a plurality of local rewards for a subset (e.g., each subset) of robots or an individual robot (e.g., each individual robot), a negative reward corresponding to collision avoidance (e.g., for a robot to avoid an object or another robot, or for two robots to cooperatively avoid each other), or the like. In some examples, a combination of rewards may be used (e.g., individual and group rewards).

The technique 1000 includes an operation 1006 to determine at least one action primitive to retrieve from an action primitive library based on the received information. In an example, the at least one action primitive is specified in the information corresponding to the collaborative task. In another example, the at least one action primitive is determined iteratively while training a model (e.g., with or during operation 1008). The action primitive library may include actions, interactions, sub-tasks, or the like. The action primitive library may be built using a reinforcement learning technique or a kinematics-control technique. A sub-task may be identified as comprising two or more action primitives of the set of action primitives. The library may be updated by storing the sub-task in a database storing the library.

The technique 1000 includes an operation 1008 to train a model to control operations of at least one robot of the set of robots using the received information and the at least one action primitive, based on a deep reinforcement learning technique or a kinematics-control technique. The model may include an overall model for the entire set of robots, a model for an individual robot, a model for a subset of robots, or a combination of any number of these models. In an example, the deep reinforcement learning technique is a multi-agent reinforcement learning technique.

In an example, each robot of the set of robots is configured to output a tuple including an object, a primitive, and a goal vector to achieve the collaborative task. The goal vector may include a navigation task. These configurations may differ for different robots, such that a combination of different robots may be used to complete hybrid tasks, such as sorting, packing, and transporting.

The technique 1000 may include an operation to collect next states and rewards of the set of robots for an environment in a replay buffer after execution of each training step in the deep reinforcement learning technique. This operation may include computing, using the next states and rewards, gradients of a loss function for updating the reward.

In an example, movement of one or more (e.g., each) of the robots of the set of robots may be restricted to only movements corresponding to actions or interactions in the set of action primitives.

While the technique 1000 is described with respect to a collaborative task, other implementations may include using a set of action primitives to program a set of robots that are not performing a collaborative task, but which still may have similar actions that can be programmed and coordinated using the set of action primitives.

Figure 11:
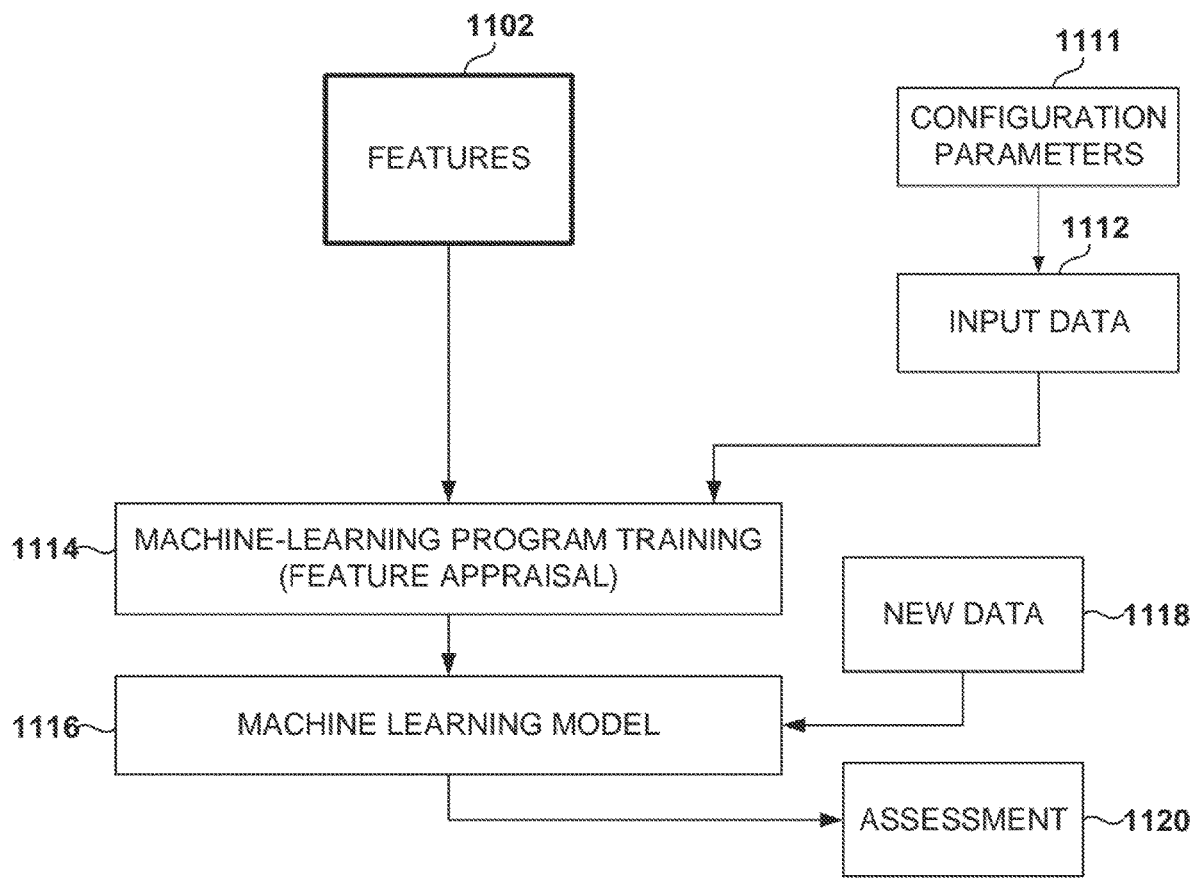
FIG. 11 illustrates training and use of a machine-learning program in accordance with some example examples.

FIG. 11 illustrates the training and use of a machine-learning program, according to some example embodiments.

In some example embodiments, machine-learning programs (MLPs), also referred to as machine-learning algorithms or tools, are utilized to coordinate robots to perform a complex task.

Machine Learning (ML) is an application that provides computer systems the ability to perform tasks, without explicitly being programmed, by making inferences based on patterns found in the analysis of data. Machine learning explores the study and construction of algorithms, also referred to herein as tools, that may learn from existing data and make predictions about new data. Although example embodiments are presented with respect to a few machine-learning tools, the principles presented herein may be applied to other machine-learning tools.

Unsupervised ML is the training of an ML algorithm using information that is neither classified nor labeled, and allowing the algorithm to act on that information without guidance. Unsupervised ML is useful in exploratory analysis because it can automatically identify structure in data.

Some common tasks for unsupervised ML include clustering, representation learning, and density estimation. Some examples of commonly used unsupervised-ML algorithms are K-means clustering, principal component analysis, and autoencoders. In some embodiments, example ML model 1116 outputs actions for one or more robots to achieve a complex task.

The machine-learning algorithms use data 1112 (e.g., action primitives or interaction primitives, goal vector, reward, etc.) to find correlations among identified features 1102 that affect the outcome. A feature 1102 is an individual measurable property of a phenomenon being observed. The concept of a feature is related to that of an explanatory variable used in statistical techniques such as linear regression. Choosing informative, discriminating, and independent features is important for effective operation of ML in pattern recognition, classification, and regression. Features may be of different types, such as numeric features, strings, and graphs.

During training 1114, the ML algorithm analyzes the input data 1112 based on identified features 1102 and configuration parameters 1111 defined for the training (e.g., environmental data, state data, etc.). The result of the training 1114 is an ML model 1116 that is capable of taking inputs to produce a complex task.

Training an ML algorithm involves analyzing data to find correlations. The ML algorithms utilize the input data 1112 to find correlations among the identified features 1102 that affect the outcome or assessment 1120.

The ML algorithms usually explore many possible functions and parameters before finding what the ML algorithms identify to be the best correlations within the data; therefore, training may make use of large amounts of computing resources and time, such as many iterations for a Reinforcement Learning technique.

Many ML algorithms include configuration parameters 1111, and the more complex the ML algorithm, the more parameters there are that are available to the user. The configuration parameters 1111 define variables for an ML algorithm in the search for the best ML model.

When the ML model 1116 is used to perform an assessment, new data 1118 is provided as an input to the ML model 1116, and the ML model 1116 generates the assessment 1120 as output.

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together but may comprise disparate instructions stored in different locations which, when joined logically together (e.g., including over a wire, over a network, using one or more platforms, wirelessly, via a software component, or the like), comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center) than that in which the code is deployed (e.g., in a computer embedded in a sensor or robot). Similarly, operational data may be identified and illustrated herein within components or modules and may be embodied in any suitable form and organized within any suitable type of data structure. The operational data may be collected as a single data set or may be distributed over different locations including over different storage devices, and may exist, at least partially, merely as electronic signals on a system or network. The components or modules may be passive or active, including agents operable to perform desired functions.

Additional examples of the presently described method, system, and device examples include the following, non-limiting implementations. Each of the following non-limiting examples may stand on its own or may be combined in any permutation or combination with any one or more of the other examples provided below or throughout the present disclosure.

Example 1 is a system for robotics machine learning training, the system comprising: at least one processing circuitry; and memory, including instructions for training a set of robots to perform collaborative tasks, which when executed by the at least one processing circuitry, cause the at least one processing circuitry to perform operations to: identify a set of action primitives applicable to the set of robots from an action primitive library, each action primitive of the set of action primitives defining a control action for a robot or a cooperative action of two or more robots; receive information corresponding to a collaborative task; determine at least one action primitive to retrieve from the action primitive library based on the received information; and train a model to control operations of at least one robot of the set of robots to complete the collaborative task using the received information and the at least one action primitive.

In Example 2, the subject matter of Example 1 includes, wherein the information corresponding to the collaborative task includes a respective state space for the at least one robot includes at least one of perception inputs, position, or orientation information for the at least one robot, position or orientation information for the set of robots other than the at least one robot, or a pose of an object in an environment.

In Example 3, the subject matter of Examples 1-2 includes, wherein the information corresponding to the collaborative task includes an action space includes an available action primitive or a goal location vector.

In Example 4, the subject matter of Examples 1-3 includes, wherein the model is trained using a deep reinforcement learning technique or a kinematics-control technique.

In Example 5, the subject matter of Examples 1-4 includes, wherein each robot of the set of robots is capable of outputting a tuple including an object, a primitive, and a goal vector to achieve the collaborative task.

In Example 6, the subject matter of Examples 1-5 includes, wherein the information corresponding to the collaborative task includes a global reward for all robots of the set of robots.

In Example 7, the subject matter of Examples 1-6 includes, wherein the information corresponding to the collaborative task includes a plurality of rewards for each subset of robots or each individual robot of the set of robots.

In Example 8, the subject matter of Examples 1-7 includes, wherein the information corresponding to the collaborative task includes a negative reward corresponding to collision avoidance.

In Example 9, the subject matter of Examples 1-8 includes, wherein the instructions further include operations to: collect next states and rewards of the set of robots for an environment in a replay buffer after execution of each training step in a deep reinforcement learning technique to train the model; and compute, using the next states and rewards, gradients of a loss function for updating the reward.

In Example 10, the subject matter of Examples 1-9 includes, wherein the at least one processing circuitry and memory are part of a command device in communication with each of the set of robots, and wherein the instructions further include operations to deploy the trained model to control actions of the set of robots to achieve the collaborative task independent of the command device.

In Example 11, the subject matter of Examples 1-10 includes, wherein the at least one action primitive is specified in the information corresponding to the collaborative task.

In Example 12, the subject matter of Examples 1-11 includes, wherein movement of each of the robots of the set of robots is restricted to only movements corresponding to actions or interactions in the set of action primitives.

In Example 13, the subject matter of Examples 1-12 includes, wherein the set of action primitives in the action primitive library is stored in a database and includes action primitives created by reinforcement learning techniques or kinematics-control techniques.

In Example 14, the subject matter of Examples 1-13 includes, wherein the instructions further include operations to: identify a sub-task comprising two or more action primitives of the set of action primitives; and updating the action primitive library by storing the sub-task in the database.

Example 15 is at least one machine-readable medium including instructions for robotics machine learning training, which when executed by processing circuitry, causes the processing circuitry to perform operations to: identify a set of action primitives applicable to a set of robots from an action primitive library, each action primitive of the set of action primitives defining a control action for a robot or a cooperative action of two or more robots; receive information corresponding to a collaborative task, including a reward; determine at least one action primitive to retrieve from the action primitive library based on the received information; and train a model to control operations of at least one robot of the set of robots to complete the collaborative task using the received information and the at least one action primitive.

In Example 16, the subject matter of Example 15 includes, wherein e information corresponding to the collaborative task includes a respective state space for the at least one robot includes at least one of perception inputs, position, or orientation information for the at least one robot, position or orientation information for set of robots other than the at least one robot, or a pose of an object in an environment.

In Example 17, the subject matter of Examples 15-16 includes, wherein the instructions further include operations to: collect next states and rewards of the set of robots for an environment in a replay buffer after execution of each training step in a deep reinforcement learning technique to train the model; and compute, using the next states and rewards, gradients of a loss function for updating the reward.

In Example 18, the subject matter of Examples 15-17 includes, wherein the machine-readable medium is part of a command device configured to communicate with the set of robots, and wherein the instructions further include operations to deploy the trained model to control actions of the set of robots to achieve the collaborative task independent of the command device.

In Example 19, the subject matter of Examples 15-18 includes, wherein movement of each of the robots of the set of robots is restricted to only movements corresponding to actions or interactions in the set of action primitives.

In Example 20, the subject matter of Examples 15-19 includes, wherein e information corresponding to the collaborative task includes a reward, including at least one of a global reward for all robots of the set of robots, a reward for a subset of robots or an individual robot of the set of robots, or a negative reward corresponding to collision avoidance.

Example 21 is a robot for machine learning training, the robot comprising: processing circuitry; and memory, including instructions for use in training a set of robots to perform collaborative tasks, which when executed by the processing circuitry, cause the processing circuitry to perform operations to: generate a set of action primitives applicable to the set of robots for storing in a primitives library, each action primitive of the set of action primitives defining a control action for the robot generate a set of interaction primitives applicable to the set of robots for storing in the primitives library, each interaction primitive of the set of interaction primitives defining a cooperative control action for the robot and at least one other robot; receive at least one action primitive to retrieve from the action primitive library and a reward based on information corresponding to a collaborative task, the at least one action primitive used to complete a portion of the collaborative task; and iteratively train a model with the robot to control operations of the set of robot to complete the collaborative task using the at least one action primitive and the reward.

In Example 22, the subject matter of Example 21 includes, wherein the reward includes at least one of a global reward for all robots of the set of robots, a reward for a subset of robots or an individual robot of the set of robots, or a negative reward corresponding to collision avoidance.

In Example 23, the subject matter of Examples 21-22 includes, wherein the set of action primitives and the set of interaction primitives in the primitives library are stored in a database and include primitives created by reinforcement learning techniques or kinematics-control techniques.

Example 24 is an apparatus for robotics machine learning training, the apparatus comprising: means for identifying a set of action primitives applicable to the set of independent robots from an action primitive library, each action primitive of the set of action primitives defining a control action for a robot or a cooperative action involving two or more robots; means for receiving3 information corresponding to a robotic task, including a reward; means for determining at least one action primitive to retrieve from the action primitive library based on the received information; and means for training a model to control operations of at least one robot of the set of independent robots to complete the collaborative task using the received information and the at least one action primitive.

In Example 25, the subject matter of Example 24 includes, wherein the set of action primitives in the action primitive library is stored in a database and includes action primitives created by reinforcement learning techniques or kinematics-control techniques.

Example 26 is at least one machine-readable medium including instructions that, when executed by processing circuitry, cause the processing circuitry to perform operations to implement of any of Examples 1-25.

Example 27 is an apparatus comprising means to implement of any of Examples 1-25.

Example 28 is a system to implement of any of Examples 1-25.

Example 29 is a method to implement of any of Examples 1-25.

Although these implementations have been described with reference to specific exemplary aspects, it will be evident that various modifications and changes may be made to these aspects without departing from the broader scope of the present disclosure. Many of the arrangements and processes described herein can be used in combination or in parallel implementations to provide greater bandwidth/throughput and to support edge services selections that can be made available to the edge systems being serviced. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

Such aspects of the inventive subject matter may be referred to herein, individually and/or collectively, merely for convenience and without intending to voluntarily limit the scope of this application to any single aspect or inventive concept if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects. Combinations of the above aspects and other aspects not specifically described herein will be apparent to those of skill in the art upon reviewing the above description.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

What is claimed is:

1. A system for robotics machine learning training, the system comprising:
    at least one processing circuitry; and
    memory, including instructions for training a set of robots to perform collaborative tasks, which when executed by the at least one processing circuitry, cause the at least one processing circuitry to perform operations to:
    identify a set of action primitives applicable to the set of robots from an action primitive library, each action primitive of the set of action primitives defining a control action for a robot or a cooperative action of two or more robots, wherein the set of action primitives includes at least one action primitive defining a control action and at least one action primitive defining a cooperative action of two or more robots;
    receive information corresponding to a collaborative task;
    determine at least one action primitive to retrieve from the action primitive library based on the received information, the at least one action primitive defining a cooperative action of two or more robots; and
    train a model to control operations of at least one robot of the set of robots to complete the collaborative task using the received information and the at least one action primitive.

2. The system of claim 1, wherein the information corresponding to the collaborative task includes a respective state space for the at least one robot includes at least one of perception inputs, position, or orientation information for the at least one robot, position or orientation information for the set of robots other than the at least one robot, or a pose of an object in an environment.

3. The system of claim 1, wherein the information corresponding to the collaborative task includes an action space includes an available action primitive or a goal location vector.

4. The system of claim 1, wherein the model is trained using a deep reinforcement learning technique or a kinematics-control technique.

5. The system of claim 1, wherein each robot of the set of robots is capable of outputting a tuple including an object, a primitive, and a goal vector to achieve the collaborative task.

6. The system of claim 1, wherein the information corresponding to the collaborative task includes a global reward for all robots of the set of robots.

7. The system of claim 1, wherein the information corresponding to the collaborative task includes a plurality of rewards for each subset of robots or each individual robot of the set of robots.

8. The system of claim 1, wherein the information corresponding to the collaborative task includes a negative reward corresponding to collision avoidance.

9. The system of claim 1, wherein the instructions further include operations to:
    collect next states and rewards of the set of robots for an environment in a replay buffer after execution of each training step in a deep reinforcement learning technique to train the model; and
    compute, using the next states and rewards, gradients of a loss function for updating the reward.

10. The system of claim 1, wherein the at least one processing circuitry and memory are part of a command device in communication with each of the set of robots, and wherein the instructions further include operations to deploy the trained model to control actions of the set of robots to achieve the collaborative task independent of the command device.

11. The system of claim 1, wherein the at least one action primitive is specified in the information corresponding to the collaborative task.

12. The system of claim 1, wherein movement of each of the robots of the set of robots is restricted to only movements corresponding to actions or interactions in the set of action primitives.

13. The system of claim 1, wherein the set of action primitives in the action primitive library is stored in a database and includes action primitives created by reinforcement learning techniques or kinematics-control techniques.

14. The system of claim 1, wherein the instructions further include operations to:
    identify a sub-task comprising two or more action primitives of the set of action primitives; and
    updating the action primitive library by storing the sub-task in a database.

15. At least one machine-readable medium including instructions for robotics machine learning training, which when executed by processing circuitry, causes the processing circuitry to perform operations to:
    identify a set of action primitives applicable to a set of robots from an action primitive library, each action primitive of the set of action primitives defining a control action for a robot or a cooperative action of two or more robots, wherein the set of action primitives includes at least one action primitive defining a control action and at least one action primitive defining a cooperative action of two or more robots;
    receive information corresponding to a collaborative task, including a reward;
    determine at least one action primitive to retrieve from the action primitive library based on the received information, the at least one action primitive defining a cooperative action of two or more robots; and
    train a model to control operations of at least one robot of the set of robots to complete the collaborative task using the received information and the at least one action primitive.

16. The at least one machine-readable medium of claim 15, wherein the information corresponding to the collaborative task includes a respective state space for the at least one robot includes at least one of perception inputs, position, or orientation information for the at least one robot, position or orientation information for set of robots other than the at least one robot, or a pose of an object in an environment.

17. The at least one machine-readable medium of claim 15, wherein the instructions further include operations to:
collect next states and rewards of the set of robots for an environment in a replay buffer after execution of each training step in a deep reinforcement learning technique to train the model; and
compute, using the next states and rewards, gradients of a loss function for updating the reward.

18. The at least one machine-readable medium of claim 15, wherein the machine-readable medium is part of a command device configured to communicate with the set of robots, and wherein the instructions further include operations to deploy the trained model to control actions of the set of robots to achieve the collaborative task independent of the command device.

19. The at least one machine-readable medium of claim 15, wherein movement of each of the robots of the set of robots is restricted to only movements corresponding to actions or interactions in the set of action primitives.

20. The at least one machine-readable medium of claim 15, wherein the information corresponding to the collaborative task includes a reward, including at least one of a global reward for all robots of the set of robots, a reward for a subset of robots or an individual robot of the set of robots, or a negative reward corresponding to collision avoidance.

21. A robot for machine learning training, the robot comprising:
processing circuitry; and
memory, including instructions for use in training a set of robots to perform collaborative tasks, which when executed by the processing circuitry, cause the processing circuitry to perform operations to:
generate a set of action primitives applicable to the set of robots for storing in a primitives library, each action primitive of the set of action primitives defining a control action for the robot;
generate a set of interaction primitives applicable to the set of robots for storing in the primitives library, each interaction primitive of the set of interaction primitives defining a cooperative control action for the robot and at least one other robot, wherein the set of action primitives includes at least one action primitive defining a control action and at least one action primitive defining a cooperative action of two or more robots;
receive at least one action primitive to retrieve from the primitives library and a reward based on information corresponding to a collaborative task, the at least one action primitive used to complete a portion of the collaborative task, and the at least one action primitive defining a cooperative action of two or more robots; and
iteratively train a model with the robot to control operations of the set of robot to complete the collaborative task using the at least one action primitive and the reward.

22. The robot of claim 21, wherein the reward includes at least one of a global reward for all robots of the set of robots, a reward for a subset of robots or an individual robot of the set of robots, or a negative reward corresponding to collision avoidance.

23. The robot of claim 21, wherein the set of action primitives and the set of interaction primitives in the primitives library are stored in a database and include primitives created by reinforcement learning techniques or kinematics-control techniques.

24. An apparatus for robotics machine learning training, the apparatus comprising:
means for identifying a set of action primitives applicable to a set of independent robots from an action primitive library, each action primitive of the set of action primitives defining a control action for a robot or a cooperative action involving two or more robots, wherein the set of action primitives includes at least one action primitive defining a control action and at least one action primitive defining a cooperative action of two or more robots;
means for receiving information corresponding to a collaborative task, including a reward;
means for determining at least one action primitive to retrieve from the action primitive library based on the received information; and
means for training a model to control operations of at least one robot of the set of independent robots to complete the collaborative task using the received information and the at least one action primitive, the at least one action primitive defining a cooperative action of two or more robots.

25. The apparatus of claim 24, wherein the set of action primitives in the action primitive library is stored in a database and includes action primitives created by reinforcement learning techniques or kinematics-control techniques.

* * * * *